(12) United States Patent
Edwards et al.

(10) Patent No.: US 11,715,102 B2
(45) Date of Patent: Aug. 1, 2023

(54) DYNAMICALLY VERIFYING A SIGNATURE FOR A TRANSACTION

(71) Applicant: Capital One Service, LLC, McLean, VA (US)

(72) Inventors: Joshua Edwards, Philadelphia, PA (US); Michael Mossoba, Arlington, VA (US); Abdelkader M'Hamed Benkreira, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 148 days.

(21) Appl. No.: 16/774,977

(22) Filed: Jan. 28, 2020

(65) Prior Publication Data
US 2021/0233087 A1 Jul. 29, 2021

(51) Int. Cl.
*G06Q 20/40* (2012.01)
*G06Q 20/32* (2012.01)
(Continued)

(52) U.S. Cl.
CPC ......... *G06Q 20/4014* (2013.01); *G06N 20/00* (2019.01); *G06Q 20/322* (2013.01);
(Continued)

(58) Field of Classification Search
USPC ................ 705/44; 713/176; 382/242, 123; 235/375
See application file for complete search history.

(56) References Cited

U.S. PATENT DOCUMENTS

| 4,020,463 A | * | 4/1977 | Himmel | G06K 9/00154 |
| | | | | 382/242 |
| 4,028,674 A | * | 6/1977 | Chuang | G06K 9/00154 |
| | | | | 382/123 |

(Continued)

FOREIGN PATENT DOCUMENTS

IN 20080118914 * 5/2009

OTHER PUBLICATIONS

R. Jayadevan, Dynamic Time Warping Based Static Hand Printed Signature Verification, Apr. 17, 2009, Journal of Pattern Recognition Research 1 (2009) 52-65 (15 pages) (Year: 2009).*

(Continued)

*Primary Examiner* — Benjamin S Brindley
(74) *Attorney, Agent, or Firm* — Harrity & Harrity, LLP

(57) ABSTRACT

A first device may receive, from a second device, a request to approve a transaction wherein the request includes transaction data related to the transaction and an image of a signature of an individual that submitted the request. The first device may determine, after receiving the request, a priority level associated with the transaction based on the transaction data. The first device may process the image of the signature using a computer vision technique and/or a vector-based technique. The first device may select, from a memory storing a plurality of comparator signatures, a comparator signature for the signature based on the priority level. The first device may use the comparator signature to verify the signature to approve or deny the transaction. The first device may perform a comparison of the comparator signature and the signature in the image after processing the image and selecting the comparator signature.

20 Claims, 11 Drawing Sheets

(51) Int. Cl.
 G06N 20/00 (2019.01)
 G06V 40/30 (2022.01)
 G06V 10/75 (2022.01)
 G06V 10/46 (2022.01)

(52) U.S. Cl.
 CPC ..... *G06Q 20/40145* (2013.01); *G06V 10/469* (2022.01); *G06V 10/75* (2022.01); *G06V 40/33* (2022.01)

(56) References Cited

U.S. PATENT DOCUMENTS

| | | | | |
|---|---|---|---|---|
| 7,004,382 | B2* | 2/2006 | Sandru | G06Q 20/042 |
| | | | | 235/375 |
| 7,996,681 | B1* | 8/2011 | Wang | G06K 9/2018 |
| | | | | 713/176 |
| 9,990,632 | B1* | 6/2018 | Koeppel | G06Q 20/352 |
| 2012/0018506 | A1* | 1/2012 | Hammad | G06Q 20/409 |
| | | | | 235/375 |
| 2013/0019289 | A1* | 1/2013 | Gonser | H04L 63/08 |
| | | | | 726/6 |
| 2013/0290136 | A1* | 10/2013 | Sheets | G06Q 20/4016 |
| | | | | 705/26.35 |
| 2015/0227729 | A1* | 8/2015 | Grigg | G06Q 40/02 |
| | | | | 726/7 |
| 2017/0213022 | A1* | 7/2017 | Potash | G06V 40/70 |
| 2018/0189769 | A1* | 7/2018 | Narasimhan | G06Q 20/3278 |
| 2018/0247287 | A1* | 8/2018 | Narasimhan | G06Q 20/3276 |
| 2019/0026623 | A1* | 1/2019 | Edwards | G06T 9/00 |
| 2020/0125827 | A1* | 4/2020 | Freed | G06V 30/412 |

OTHER PUBLICATIONS

Jayadevan, R., "Dynamic Time Warping Based Static Hand Printed Signature Verification," Journal of Pattern Recognition Research 1, Apr. 17, 2009.

Srinivasan, Harish, "Machine Learning for Signature Verification," Department of Computer Science and Engineering, University at Buffalo, The State University of New York.

Newgen Software, "Signature Verification System", https://newgensoft.com/industries/banking-financial-services/payments/signature-verification-system/, Mar. 30, 2018, 7 pages.

* cited by examiner

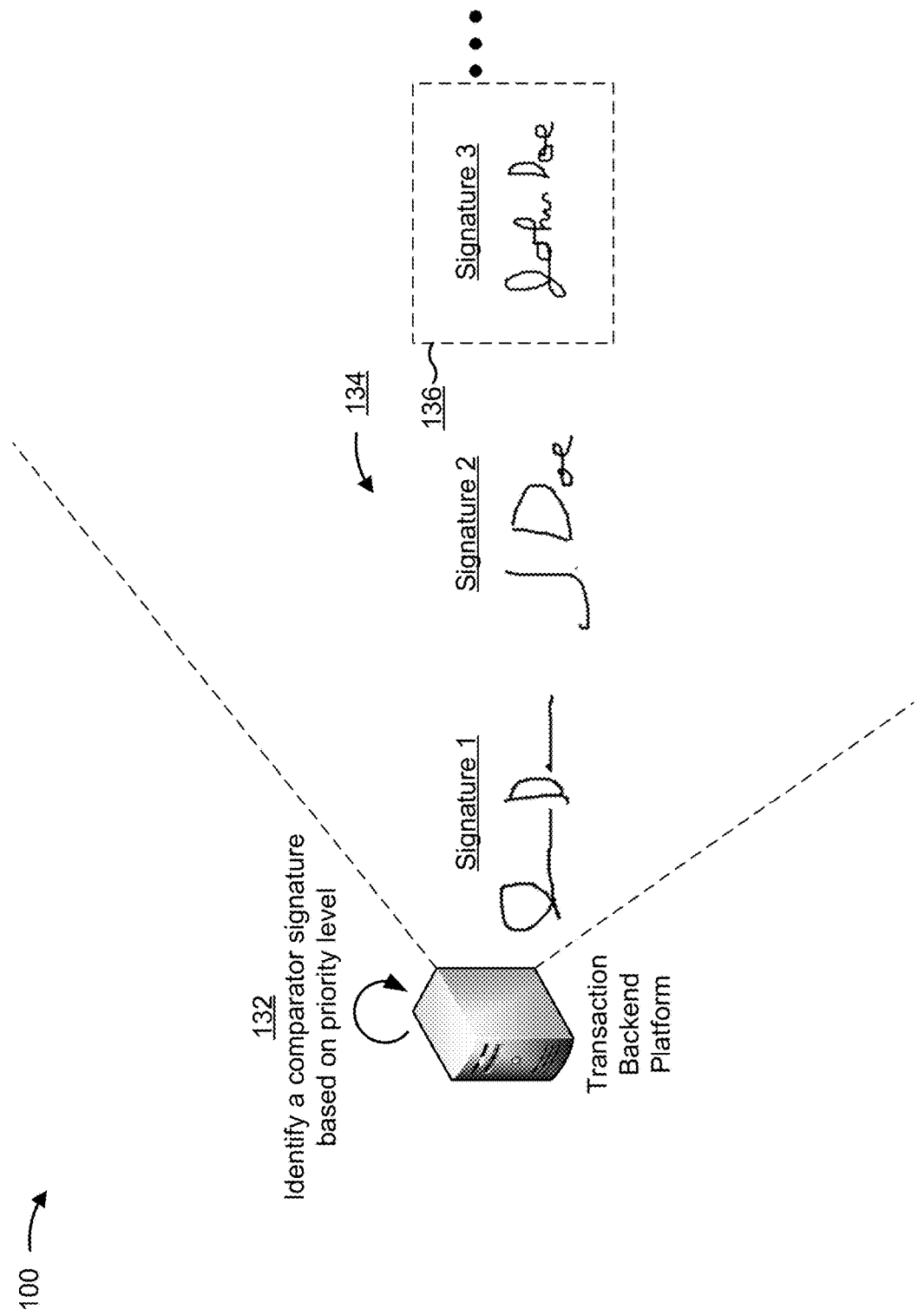

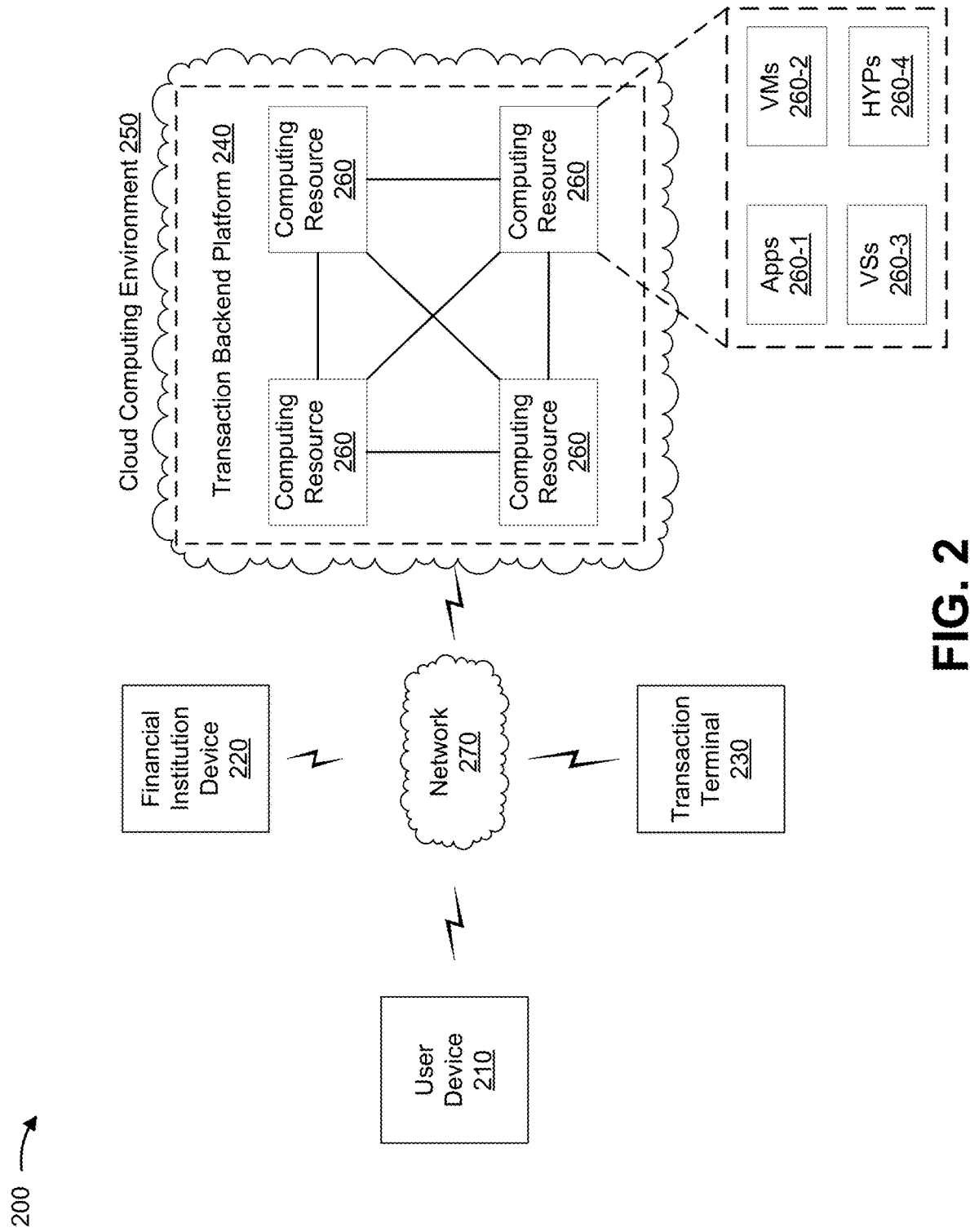

DYNAMICALLY VERIFYING A SIGNATURE FOR A TRANSACTION

BACKGROUND

During a financial transaction, an individual may be asked to provide a signature to verify the identity of the individual. For example, when the individual pays for a transaction using a credit or debit card, the individual may be asked to provide a signature (e.g., by signing a touchscreen).

SUMMARY

According to some implementations, a method may include receiving, by a first device and from a second device, a request to approve a transaction, wherein the request includes: transaction data related to the transaction, and an image of a signature of an individual that submitted the request; determining, by the first device and after receiving the request, a priority level associated with the transaction based on the transaction data; processing, by the first device, the image of the signature using at least one of: a computer vision technique, or a vector-based technique; selecting, by the first device and from a memory that stores a plurality of comparator signatures, a comparator signature, of the plurality of comparator signatures, for the signature based on the priority level, wherein the comparator signature is to be used to verify the signature to approve or deny the transaction; performing, by the first device, a comparison of the comparator signature and the signature in the image after processing the image and selecting the comparator signature; and performing, by the first device and based on a result of performing the comparison, one or more actions related to the transaction.

According to some implementations, a device may include one or more memories; and one or more processors, communicatively coupled to the one or more memories, configured to: receive a request to approve a transaction, wherein the request includes: transaction data related to the transaction, and an image of a signature of an individual that submitted the request; process, after receiving the transaction data, the transaction data to identify values for a set of parameters related to the transaction; determine, after receiving the request, a priority level associated with the transaction based on the values for the set of parameters, wherein the priority level is associated with selecting a comparator signature, from a plurality of comparator signatures stored in the one or more memories, to be used in association with determining whether to approve or deny the transaction; process the image of the signature using at least one of: a computer vision technique, or a vector-based technique; select, in association with processing the image, the comparator signature for the signature based on the priority level; perform a comparison of the comparator signature and the signature in the image after processing the image and selecting the comparator signature; and perform, based on a result of performing the comparison, one or more actions related to the transaction.

According to some implementations, a non-transitory computer-readable medium may store one or more instructions. The one or more instructions, when executed by one or more processors of a device, may cause the one or more processors to: receive, from a second device, a request to approve a transaction, wherein the request includes: transaction data related to the transaction, and an image of a signature of an individual that submitted the request; determine, after receiving the request, a priority level associated with the transaction based on the transaction data, wherein different priority levels are associated with different values for a set of parameters related to the transaction; process the image of the signature using at least one of: an image processing technique, or a vector-based technique; select, in association with processing the image, a comparator signature for the signature based on the priority level, wherein the comparator signature is selected from a plurality of comparator signatures, stored in a memory of the first device, for the individual, wherein the comparator signature is to be used to verify the signature for approving or denying the transaction; perform a comparison of the comparator signature and the signature in the image after processing the image and selecting the comparator signature; determine, based on a result of performing the comparison, a score that indicates a degree of similarity between the comparator signature and the signature; and perform, based on the score, one or more actions related to the transaction.

BRIEF DESCRIPTION OF THE DRAWINGS

FIGS. 1A-1F are diagrams of one or more example implementations described herein.

FIG. 2 is a diagram of an example environment in which systems and/or methods described herein may be implemented.

DETAILED DESCRIPTION

Figure 1A:
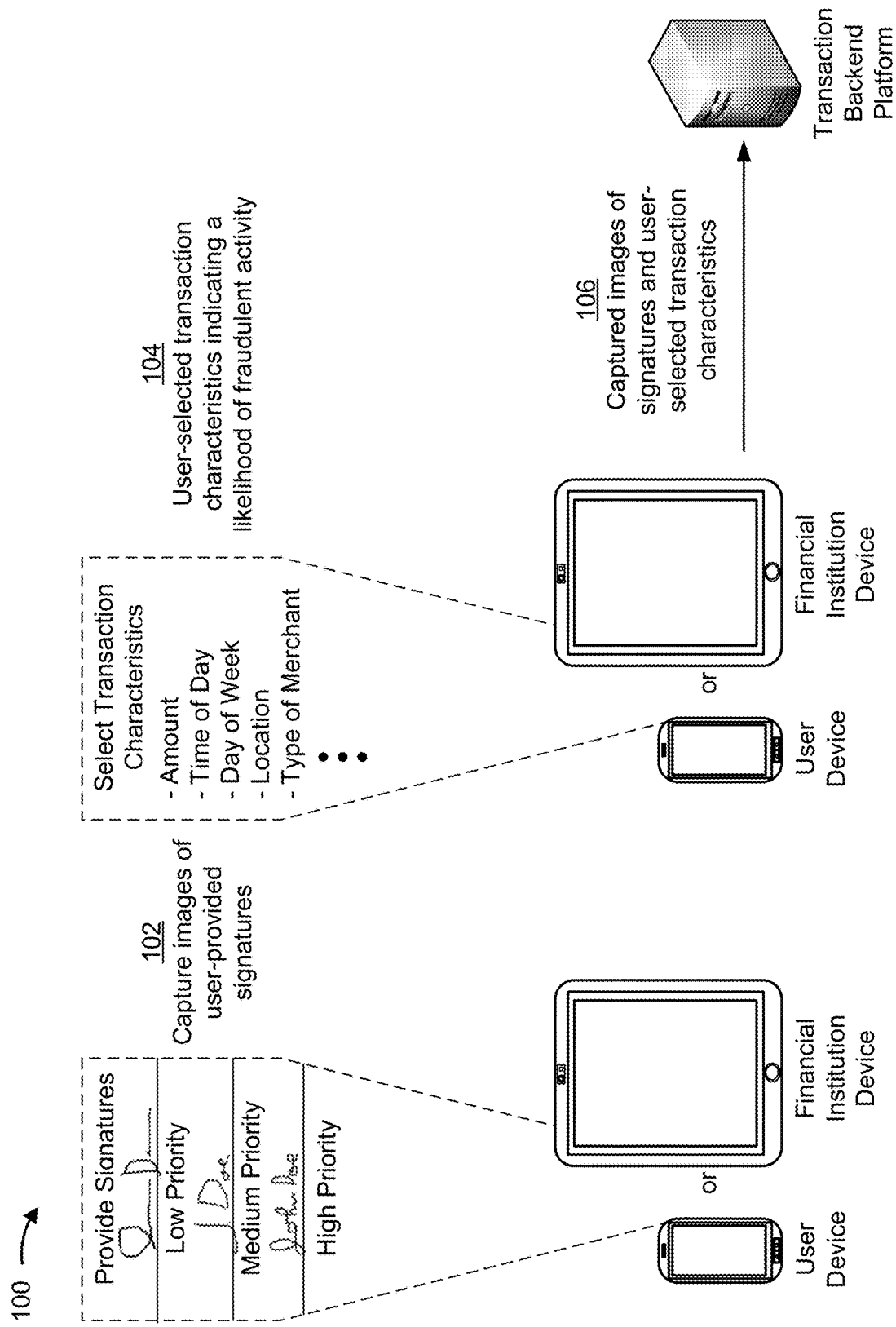

The following detailed description of example implementations refers to the accompanying drawings. The same reference numbers in different drawings may identify the same or similar elements.

In many instances, when an individual pays for a transaction with a merchant using a transaction method (e.g., a credit card service, a debit card service, a mobile payment service, a digital wallet service, and/or the like), the merchant requests that the individual provide a signature (e.g., by signing a touchscreen or by uploading an image of a signature). The merchant provides the signature to an entity managing the transaction method (e.g., a bank or a credit card issuer) in a request to approve the transaction. The entity may use the signature to determine whether to approve or deny the transaction. For example, the entity may compare the signature to previously stored signatures, and if the signature is similar to previously stored signatures, the entity may approve the transaction.

In some instances, individuals change their signature over time intentionally or unintentionally. For example, an individual may intentionally change their signature to include a middle name or middle initial, to restyle their signature, to simplify their signature, or to make their signature more secure. An individual may unintentionally change their signature because they are rushing during the transaction, they have difficulty recreating their signature on a signature-capturing device, or they naturally change their signature over time.

Such changes present security challenges for entities managing transaction methods. For example, the individual providing the signature to the merchant may be an authorized user of the transaction method, but due to intentional or unintentional changes, the provided signature may not be similar enough to previously stored signatures for the entity to approve the transaction. While storing numerous signatures to be used for comparison may reduce the likelihood that intentional or unintentional changes would increase denied transactions, storing many signatures and then comparing a signature associated with a transaction to each of the stored signatures consumes additional computing resources (e.g., processing resources, memory resources, power resources, communication resources, and/or the like) and/or network resources.

Denied transactions not only frustrate the merchant and the individual using the transaction method but also consume additional computing resources (e.g., processing resources, memory resources, power resources, communication resources, and/or the like) and/or network resources due to repeated attempts to conduct and request authorization of the transaction using a newly captured signature. Furthermore, lowering the threshold for determining that a provided signature is similar enough to a stored signature may improve the experience of the merchant and the individual but may also increase the risk that a fraudulent individual may use the transaction method and provide a signature similar enough to a stored signature to trigger approval of the transaction by the entity. Identifying, investigating, and/or correcting any fraudulent activity consumes additional computing resources (e.g., processing resources, memory resources, power resources, communication resources, and/or the like) and/or network resources. Therefore, previous techniques for verifying signatures for transactions consume additional computing resources and/or network resources due to repeated attempts to request authorization of transactions, due to identifying, investigating, and/or correcting fraudulent activity, and/or the like.

Some implementations described herein provide a more secure system for verifying signatures for transactions. As described herein, a transaction backend platform may determine a priority level associated with a transaction based on transaction data (e.g., an amount (e.g., amount of money exchanged in the transaction), a time of day, a day of the week, a location of the transaction, an identity of the merchant, a location of the merchant, a type of the merchant, an identity of the purchaser, a location of the purchaser (e.g., a location of a personal computer placing an online order), a type of goods and/or services, a type of transaction, a type of agreement (e.g., mortgage agreement, auto loan agreement, home equity loan agreement, and/or the like), one or more entities associated with the transaction (e.g., the purchaser, the merchant, a financial institution (e.g., a bank or a credit card issuer), and/or the like), and/or the like). The transaction backend platform may select an appropriate comparator signature to use for verifying a signature submitted with the transaction based on the priority level.

For example, the transaction backend platform may receive comparator signatures, user-selected transaction characteristics indicating a higher likelihood of fraudulent activity, and/or financial-institution-selected transaction characteristics (e.g., from a financial institution, such as a bank or credit card issuer) indicating a higher likelihood of fraudulent activity. The transaction backend platform may receive a request to approve a transaction, where the request includes transaction data associated with the transaction (e.g., values for a set of parameters related to the transaction, transaction characteristics, and/or the like) and an image of a signature. Based on the user-selected transaction characteristics and/or the financial-institution-selected transaction characteristics, the transaction backend platform may determine a priority level for the transaction based on the transaction data. Based on the priority level, the transaction backend platform may identify a comparator signature to be used for verifying the signature in the image.

As described herein, after identifying the comparator signature, the transaction backend platform may use an image processing technique (e.g., a computer vision technique, a vector-based technique, and/or the like) to identify characters and/or symbols in the signature in the image, characteristics of the signature in the image, and/or the like. The transaction backend platform may compare the characters and/or symbols in the signature in the image and/or the characteristics of the signature in the image with characters and/or symbols in the comparator signature and/or characteristics of the comparator signature. Based on the degree to which the comparator signature and the signature in the image match, the device may perform one or more actions, such as approving or denying the transaction.

Some implementations, as described herein, conserve computing resources (e.g., processing resources, memory resources, power resources, and/or the like) and/or network resources involved in verifying signatures associated with transactions. Some implementations, as described herein, conserve computing resources (e.g., processing resources, memory resources, power resources, and/or the like) and/or network resources involved in repeated attempts to request authorization of a transaction using a new signature. Some implementations, as described herein, conserve computing resources (e.g., processing resources, memory resources, power resources, and/or the like) and/or network resources involved in identifying, investigating, and/or correcting any fraudulent activity that would have been allowed without the use of a signature verification system described herein.

FIGS. 1A-1F are diagrams of one or more example implementations 100 described herein. For example, as shown in FIGS. 1A-1F, example implementation(s) 100 includes a user device, a financial institution device (FI device), a transaction backend platform, and a transaction terminal. As described herein, the transaction backend platform may be associated with a financial institution (e.g., a bank or a credit card issuer). In the following description, example implementation(s) 100 is described in a context that relates to verifying a signature associated with a transaction. However, it will be appreciated that this description is for illustration purposes only, and that the techniques described herein may be used to verify a signature associated with other interactions (e.g., financial institution interactions, loan and/or credit line applications (e.g., home equity loan applications, mortgage applications, auto loan applications, personal loan applications, and/or the like), legal documents, requests for new services (e.g., credit card services, credit monitoring services, and/or the like), and/or the like).

In some implementations, a user may open an application (e.g., a mobile banking application and/or the like) or access a website on a user device (e.g., a smartphone, a tablet, a personal computer, and/or the like). The user device may prompt the user to provide a username and password or otherwise authenticate an identity of the user (e.g., via a passcode, fingerprint recognition, facial recognition, and/or the like).

In some implementations, rather than using a user device, a user may access a financial institution device (FI device) (e.g., at a bank branch), such as a kiosk, computer, automatic teller machine (ATM) machine, and/or the like. For example, the user may access the FI device when opening a new account with a financial institution, when accessing an existing account with the financial institution, and/or the like. The FI device may prompt the user to provide a username and password or otherwise authenticate an identity of the user (e.g., via a passcode, fingerprint recognition, facial recognition, and/or the like).

In some implementations, the user device and/or the FI device may prompt the user to provide a plurality of signatures to be used as comparator signatures for verifying signatures associated with transactions. For example, the user device and/or the FI device may prompt the user to provide a low priority signature, a medium priority signature, and a high priority signature to be used as comparator signatures for transactions of a low priority level, a medium priority level, and a high priority level, respectively. Although three priority levels are being used as an example, the user device and/or the FI device may prompt the user to provide comparator signatures for fewer than three priority levels or more than three priority levels (e.g., five to ten priority levels) in some implementations.

Additionally, or alternatively, the user device and/or the FI device may prompt the user to provide multiple versions of a comparator signature for each priority level (e.g., three to six versions for each priority level). For example, the user device and/or the FI device may prompt the user to provide multiple versions of a low priority signature, multiple versions of a medium priority signature, and multiple versions of a high priority signature. Using multiple versions of a comparator signature for each priority level may improve the efficiency and/or accuracy of signature verification (e.g., by enabling the determination of a signature pattern and/or the like), thereby conserving computing resources (e.g., processing resources, memory resources, power resources, and/or the like) and/or network resources involved in verifying signatures, and in repeated attempts to request authorization of a transaction using a new signature.

For each signature, the user device and/or the FI device may prompt the user by displaying a signature line and a text-based description of the type of signature to be provided. For the low priority signature, the text-based description may include "low priority," "scribble or initials," and/or the like. For the medium priority signature, the text-based description may include "medium priority," "first initial and last name," and/or the like. For the high priority signature, the text-based description may include "high priority," "complete first and last name," and/or the like. In some implementations, the user device and/or the FI device may prompt the user to provide less formal signatures for lower priority levels and more formal signatures for higher priority levels.

As shown in FIG. 1A, and by reference number 102, the user device and/or the FI device may capture images of the user-provided signatures. For example, the user may provide a signature on a touchscreen associated with the user device and/or the FI device, and the user device and/or the FI device may capture an image of the signature on the touchscreen. As another example, the user may provide the signature using another input device (e.g., a mouse, a touchpad (e.g., using a finger, using a signing pen, and/or the like), and/or the like) associated with the user device and/or the FI device, and the user device and/or the FI device may convert input received into an image of the signature.

Additionally, or alternatively, the user may provide the signature by selecting a stored image of the signature (e.g., previously stored on the user device and/or the FI device). For example, the user device may store images of signatures previously provided by the user (e.g., images of signatures provided for previous transactions and/or the like) and may display a list of the stored images of signatures for selection by the user for one or more of the priority levels. As another example, the FI device may have access to a data structure storing images of signatures previously provided to the financial institution in connection with previous transactions involving the user and may display a list of the stored images of signatures for selection by the user for one or more of the priority levels.

Additionally, or alternatively, the user may provide the signature by uploading an image of the signature. For example, the user may upload a file including an image of the signature (e.g., from another device to the user device, from another device to the FI device, and/or the like). As another example, the user may provide the signature by placing the signature (e.g., an image of the signature displayed on a device, a signed piece of paper, and/or the like) within the field of view of a camera (e.g., a camera associated with the user device and/or the FI device, and/or the like).

In some implementations, the user device and/or FI device may prompt the user to provide signatures via different methods. For example, the user device and/or FI device may prompt the user to provide multiple versions of a comparator signature for each priority level, where each version is provided using a different method (e.g., a touchscreen, a touchpad with a finger, a touchpad with a signing pen, a mouse, uploading an image of a signed piece of paper, and/or the like). In some implementations, the user may provide an indication, to the user device and/or FI device, of the manner in which the user provided each signature. For example, the user may provide, for each signature, a name and/or a label (e.g., "touchscreen signature," "touchpad finger signature," "touchpad pen signature," "mouse signature," "paper signature," and/or the like). In some implementations, the user device and/or FI device may prompt the user for a signature, where the prompt is based on the user-provided indication.

In some implementations, and as shown in FIG. 1A, the user device and/or the FI device may prompt the user by displaying signature lines and a text-based description of the type of signature to be provided on each signature line. For the low priority signature, the user device and/or the FI device may capture an image of a scribbled signature. For the medium priority signature, the user device and/or the FI device may capture an image of a signature including a first initial and a last name. For the high priority signature, the user device and/or the FI device may capture an image of a complete first name and last name. These low, medium, and high priority signatures are provided merely as examples of types of signatures that may be provided for the different levels of priority.

As shown in FIG. 1A, and by reference number 104, the user device and/or the FI device may prompt the user to select characteristics of transactions, where the characteristics indicate a higher likelihood of fraudulent activity. The user device and/or the FI device may display a list or menu of characteristics for selection by the user. The characteristics of a transaction may include an amount (e.g., amount of money exchanged in the transaction), a time of day, a day of the week, an identity of the merchant, a location of the merchant, a type of the merchant, an identity of the purchaser, a location of the purchaser (e.g., a location of a personal computer placing an online order), a type of goods and/or services, a type of transaction, a type of agreement (e.g., mortgage agreement, auto loan agreement, home equity loan agreement, and/or the like), and/or the like.

For example, if the user rarely makes purchases greater than $100, the user may select transactions for an amount greater than $100 to indicate that such transactions have a higher likelihood of fraudulent activity. As another example, if the user rarely makes purchases between 9 PM and 6 AM, the user may select transactions occurring between 9 PM and 6 AM to indicate that such transactions have a higher likelihood of fraudulent activity. As yet another example, if the user rarely makes purchases from merchants outside of a city in which the user lives, the user may select transactions involving a merchant located outside of the city to indicate that such transactions have a higher likelihood of fraudulent activity. If the user never travels outside of the United States, the user may select transactions involving a purchaser located outside of the United States to indicate that such transactions have a higher likelihood of fraudulent activity. If the user rarely makes purchases at car dealerships, the user may select transactions involving a car dealership as the type of merchant to indicate that such transactions have a higher likelihood of fraudulent activity. If the user rarely purchases computers and/or computer equipment, the user may select transactions involving computers and/or computer equipment as the type of goods to indicate that such transactions have a higher likelihood of fraudulent activity. As yet another example, if the user rarely enters into lease agreements (e.g., for a vehicle, office space, equipment, and/or the like), the user may select transactions involving a lease as the type of transaction to indicate that such transactions have a higher likelihood of fraudulent activity.

Additionally, or alternatively, the user device and/or the FI device may receive, from the user, selections of characteristics of transactions for which the user prefers a higher priority level of verification be used for verifying transactions than would otherwise be used. For example, the user device and/or the FI device may receive, from the user, a selection that transactions entering into a lease agreement be verified using a higher priority level of verification than would otherwise be used based on the other transaction characteristics. In other words, the user-selected characteristics may be indicative of a user preference for the application of a higher priority level of verification, rather than being indicative of a higher likelihood of fraudulent activity.

In some implementations, the characteristics may include combinations of two or more characteristics. For example, if the user rarely makes purchases during work hours on weekdays, the user-selected characteristics may include transactions conducted between 8 AM and 7 PM on a Monday, Tuesday, Wednesday, Thursday, or Friday.

As shown in FIG. 1A, and by reference number 106, the user device and/or the FI device may transmit the captured images of signatures and the user-selected characteristics to the transaction backend platform. For example, the user device and/or the FI device may transmit the images of the low priority signature, medium priority signature, and high priority signature and data representative of the user-selected characteristics to the transaction backend platform. In some implementations, the user device and/or the FI device may be configured to provide the captured images of signatures and the user-selected characteristics to the transaction backend platform after the user device and/or the FI device captures the images of signatures and/or receives the user-selected characteristics.

Figure 1B:
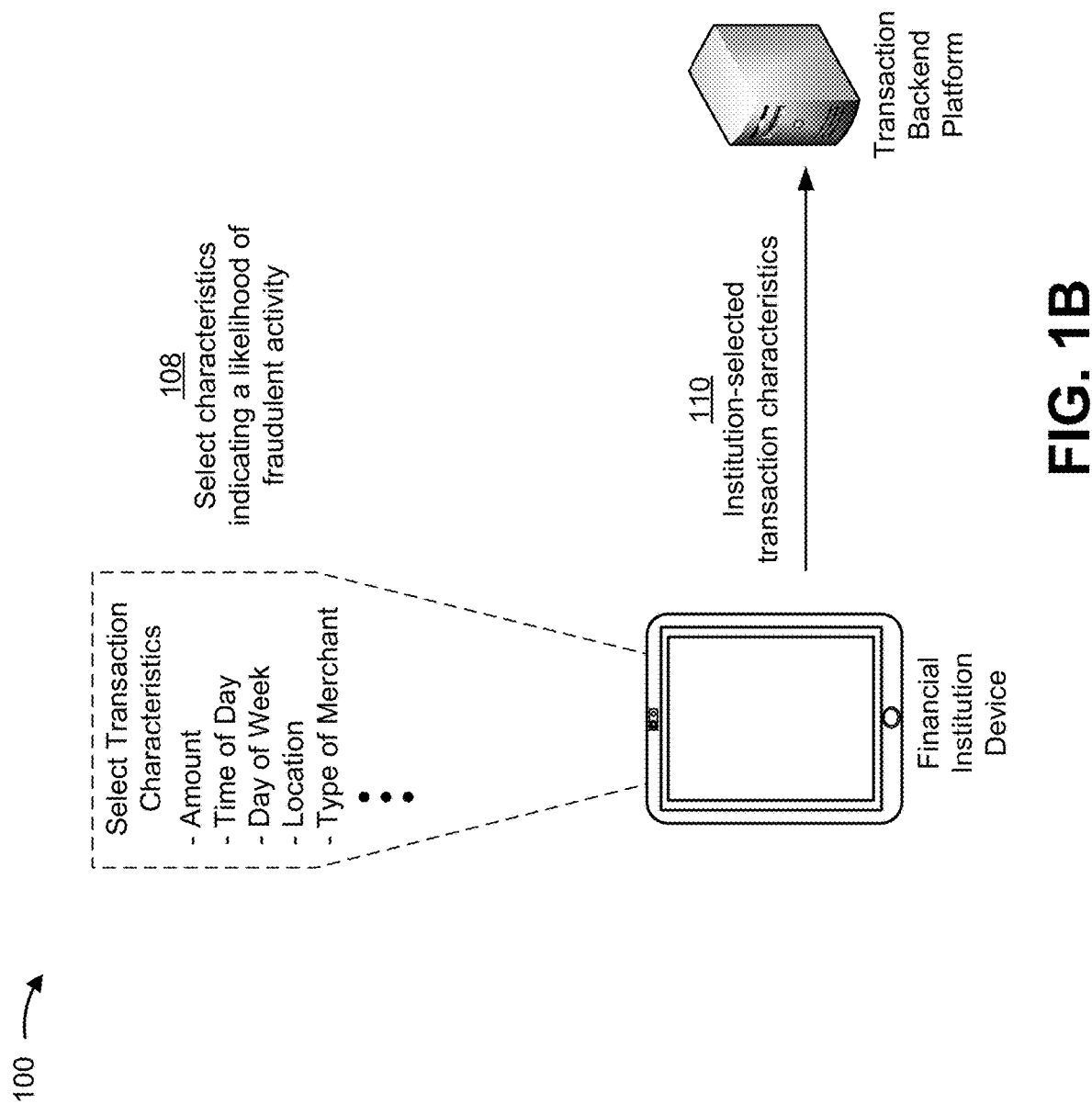

As shown in FIG. 1B, and by reference number 108, the FI device may select characteristics of transactions (hereinafter referred to as financial-institution-selected characteristics), where the characteristics indicate a higher likelihood of fraudulent activity. Similar to the user-selected characteristics, the financial-institution-selected characteristics of a transaction may include an amount (e.g., amount of money exchanged in the transaction), a time of day, a day of the week, an identity of the merchant, a location of the merchant, a type of the merchant, an identity of the purchaser, a location of the purchaser (e.g., a location of a personal computer placing an online order), a type of goods and/or services, a type of transaction, a type of agreement (e.g., mortgage agreement, auto loan agreement, home equity loan agreement, and/or the like), and/or the like. In some implementations, the financial-institution-selected characteristics may include combinations of two or more characteristics.

In some implementations, the FI device may use a machine learning model, such as a fraud detection model, to determine whether a transaction characteristic is inconsistent with historical transactions of the user thereby indicating that the transaction characteristic is associated with a higher likelihood of fraudulent activity. For example, the FI device may train the fraud detection model based on one or more transaction characteristics, such as an amount, a time of day, a day of the week, an identity of the merchant, a location of the merchant, a type of the merchant, an identity of the purchaser, a location of the purchaser, a type of goods and/or services, a type of transaction, a type of agreement, and/or the like. The FI device may train the fraud detection model using historical transaction data according to the one or more transaction characteristics. Using the historical transaction data and the one or more transaction characteristics as inputs to the fraud detection model, the FI device may determine whether a transaction characteristic is inconsistent with historical transactions of the user to determine if the transaction characteristic indicates a higher likelihood of fraudulent activity.

In some implementations, the FI device may train the fraud detection model using historical data from transactions of the user, which may reduce an amount of time, an amount of processing resources, and/or the like to train the fraud detection model relative to using historical data from transactions of a plurality of users. That said, in some implementations, the FI device may train the fraud detection model using historical data from transactions of a plurality of users, of which the user may or may not be a member, such as a plurality of users having similar incomes, a plurality of users residing in a common city, a plurality of users having similar spending habits, and/or the like. In some implementations, the FI device may train the fraud detection model using historical data from transactions of one or more users. In some implementations, the fraud detection model may be trained using one or more techniques described below in connection with FIG. 1C.

In some implementations, the FI device may receive, from the financial institution, selections of characteristics of transactions for which the financial institution prefers a medium or high priority signature be used as a comparator signature for verifying transactions. In other words, the financial-institution-selected characteristics may be indicative of a preference for the application of a higher priority level of signature verification, rather than being indicative of a higher likelihood of fraudulent activity.

As shown in FIG. 1B, and by reference number 110, the FI device may transmit the institution-selected transaction characteristics to the transaction backend platform. In some implementations, the FI device may be configured to provide the institution-selected transaction characteristics to the transaction backend platform after each characteristic is selected and/or after all of the characteristics are selected.

In some implementations, the FI device may update and/or select new financial-institution-selected characteristics (e.g., based on newer historical transaction data and/or the like). For example, the FI device may update and/or select new financial-institution-selected characteristics on a regular basis (e.g., daily, weekly, monthly, yearly, and/or the like) or on an irregular basis (e.g., after fraudulent activity is reported, after a threshold amount of fraudulent activity is reported, and/or the like) in an effort to prevent fraudulent activity based on recent trends and/or patterns in fraudulent activity. As another example, the FI device may receive, from the financial institution, updated and/or new selections of characteristics of transactions for which the financial institution prefers a medium or high priority signature be used as a comparator signature for verifying transactions. In some implementations, the FI device may be configured to provide the institution-selected transaction characteristics to the transaction backend platform after updating and/or selecting new financial-institution-selected characteristics.

Figure 1C:
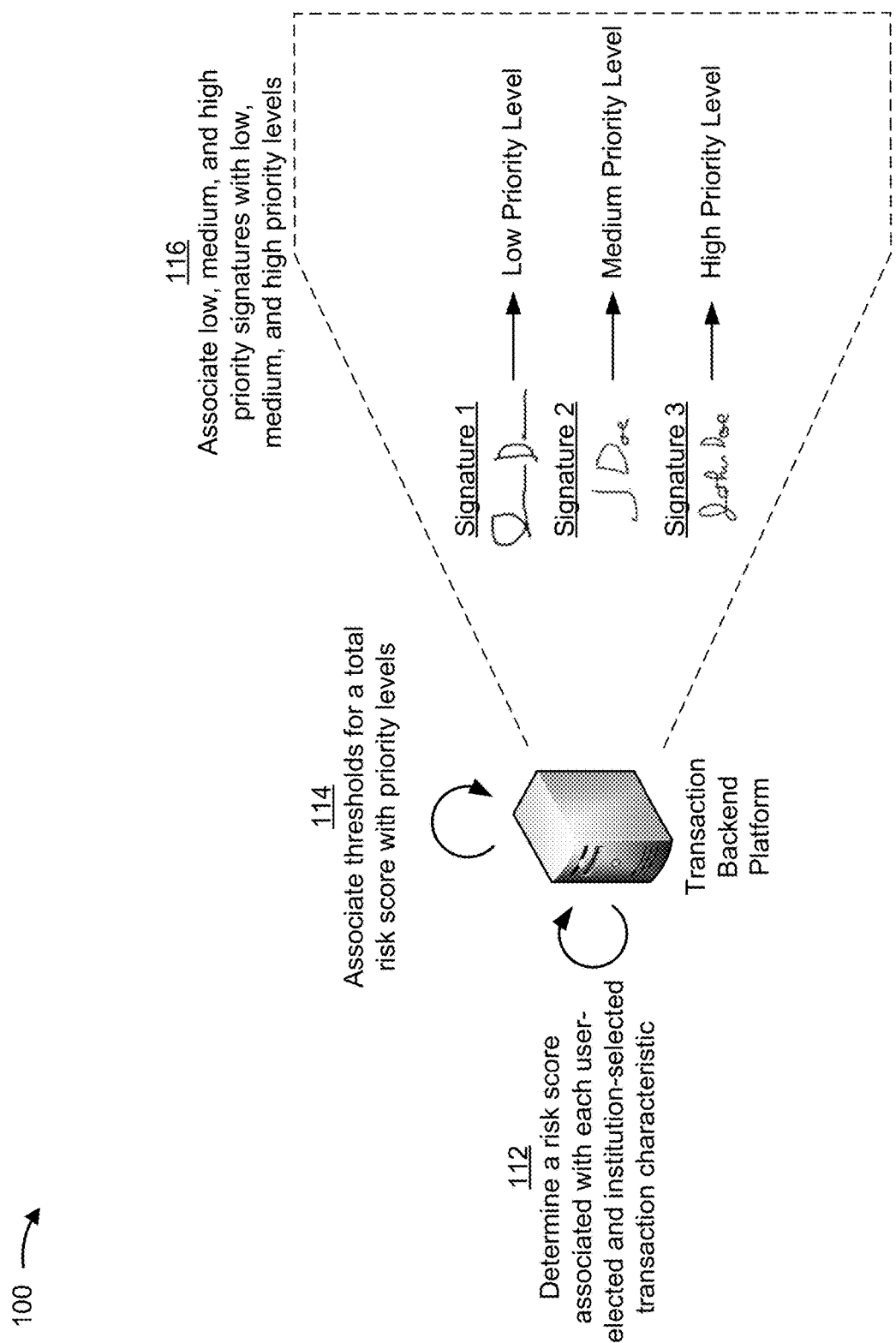

As shown in FIG. 1C, and by reference number 112, the transaction backend platform may determine risk scores associated with the user-selected transaction characteristics and/or the institution-selected transaction characteristics. In some implementations, the transaction backend platform may determine that a first user-selected transaction characteristic is associated with a higher likelihood of fraudulent activity and that a second user-selected transaction characteristic is associated with a lower likelihood of fraudulent activity. In such circumstances, the transaction backend platform may determine that the first user-selected transaction characteristic has a higher risk score than the second user-selected transaction characteristic. In other words, the transaction backend platform may assign a risk score to a given transaction characteristic based on a likelihood that a transaction with the given transaction characteristic involves fraudulent activity, where higher scores are associated with higher likelihoods.

For example, the transaction backend platform may determine that the institution-selected transaction characteristic of transactions involving a purchaser located outside of the United States is associated with higher likelihoods of fraudulent activity than the institution-selected transaction characteristic of transactions involving an amount greater than $100. In such circumstances, the transaction backend platform may assign a higher risk score to the institution-selected transaction characteristic of transactions involving a purchaser located outside of the United States than the risk score assigned to the institution-selected transaction characteristic of transactions involving an amount greater than $100.

As described herein, the transaction backend platform may use one or more artificial intelligence techniques, such as machine learning, deep learning, and/or the like to determine a likelihood that a user-selected transaction characteristic and/or an institution-selected transaction characteristic is associated with fraudulent activity.

While the description to follow will describe the transaction backend platform as determining a risk score for each individual characteristic, the description is not limited to each characteristic being associated with a risk score. In practice, the transaction backend platform may determine a risk score for a combination of characteristics. For example, the transaction backend platform determine that a combination of characteristics is associated with a high likelihood of involving fraudulent activity, whereas each individual characteristic in the combination may not be associated with a high likelihood of involving fraudulent activity when considered alone. By considering combinations of characteristics, the transaction backend platform may improve an accuracy of its fraud determinations.

In some implementations, the transaction backend platform may parse natural language descriptions of historical information related to transactions (also referred to herein as "historical transaction information"). For example, the transaction backend platform may obtain data identifying, in natural language, a description of a plurality of historical transactions (e.g., amounts, times of day, days of the week, locations of the merchants, locations of the purchasers, types of merchants, types of goods and/or services, types of transactions, indicators of fraudulent activity, and/or the like), and/or the like, and may parse the data to identify the transaction characteristics of the historical transactions, and/or the like. The transaction backend platform may obtain the historical transaction information from one or more sources, such as a financial institution, a government agency, a law enforcement agency, a consumer protection agency, and/or the like. In some implementations, the transaction backend platform may limit the data obtained to data specific to transactions having one or more of the user-selected transaction characteristics and/or one or more of the institution-selected transaction characteristics. By limiting the data, the transaction backend platform may optimize the data set for determining the likelihood that a user-selected transaction characteristic and/or an institution-selected transaction characteristic is associated with fraudulent activity, which may make efficient use of computing resources. In some implementations, the transaction backend platform may not limit the data obtained to data specific to transactions having one or more of the user-selected transaction characteristics and/or one or more of the institution-selected transaction characteristics. By not limiting the data, the transaction backend platform may determine one or more other characteristics that are associated with fraudulent activity.

In some implementations, the transaction backend platform may determine an attribute of a transaction characteristic based on natural language processing of the historical transaction information, which may include a description of the transaction characteristic. For example, based on a description of a transaction characteristic being identified as associated with a fraudulent transaction, the transaction backend platform may use natural language processing to determine that an attribute of the transaction characteristic is that the transaction characteristic is associated with fraudulent transactions. Similarly, based on a description of a transaction characteristic being described as not being associated with fraudulent transactions, the transaction backend platform may use natural language processing to determine that an attribute of the transaction characteristic is that the transaction characteristic is not associated with fraudulent transactions, and/or the like. In this case, the transaction backend platform may determine that a natural language text corresponds to an attribute of a transaction characteristic based on data relating to other transaction characteristics, data identifying attributes of transaction characteristics, and/or the like.

In this way, the transaction backend platform may identify transaction characteristics associated with fraudulent activity, as described herein. Based on applying a rigorous and automated process associated with determining a risk score for each transaction characteristic, the transaction backend platform enables recognition and/or identification of thousands or millions of data items for thousands or millions transaction characteristics, thereby increasing an accuracy and consistency of determining risk scores for transaction characteristics relative to requiring computing resources to be allocated for hundreds or thousands of technicians to manually determine risk scores based on the thousands or millions of data items.

In some implementations, the transaction backend platform may determine a likelihood that a transaction characteristic is associated with a fraudulent transaction, as described herein. For example, using historical transaction information, the transaction backend platform may determine a likelihood that a transaction characteristic is associated with a fraudulent transaction. In this case, the transaction backend platform may generate a risk analysis model. For example, the transaction backend platform may train a model using historical information that includes a plurality of characteristics of historical transactions, a plurality of determinations regarding whether the historical transactions were fraudulent, and/or the like, to determine a likelihood that a transaction characteristic is associated with a fraudulent transaction. As an example, the transaction backend platform may determine that past transactions having a transaction characteristic (or a combination of transaction characteristics), are associated with a threshold probability of being fraudulent transactions. In some implementations, the transaction backend platform may use a scoring system (e.g., with relatively high scores and/or relatively low scores) to identify and/or classify transaction characteristics as being associated with one another. In this case, the transaction backend platform may determine that a relatively high score (e.g., as having a high likelihood or a high probability) is to be assigned to a transaction characteristic that is determined to be the same or similar to a previously identified transaction characteristic that is associated with fraudulent transactions. In contrast, the transaction backend platform may determine that a relatively low score (e.g., as having a low likelihood or a low probability) is to be assigned to a transaction characteristic that is determined to be different than a past identified transaction characteristic that is associated with fraudulent transactions.

In some implementations, when training the risk analysis model, the transaction backend platform may give more weight to the user-selected transaction characteristics and/or the institution-selected transaction characteristics (e.g., by assigning a higher weight to the user-selected transaction characteristics and/or the institution-selected transaction characteristics than would otherwise be assigned to the characteristics, and/or the like). In some implementations, when training the risk analysis model, the transaction backend platform may not give more weight or may give less weight to the user-selected transaction characteristics and/or the institution-selected transaction characteristics. In some implementations, when training the risk analysis model, the transaction backend platform may give more weight, less weight, and/or no weight to one or more transaction characteristics (e.g., based on information from one or more sources, such as a financial institution, a government agency, a law enforcement agency, a consumer protection agency, and/or the like).

In some implementations, the transaction backend platform may perform a data preprocessing operation when generating the risk analysis model. For example, the transaction backend platform may preprocess data (e.g., characteristics of historical transactions, a plurality of determinations regarding whether the historical transactions were fraudulent, and/or the like) to remove non-ASCII characters, white spaces, confidential data, and/or the like). In this way, the transaction backend platform may organize thousands, millions, or billions of data entries for machine learning and model generation.

In some implementations, the transaction backend platform may perform a training operation when generating the risk analysis model. For example, the transaction backend platform may portion data of the historical transaction information into a training set (e.g., a set of data to train the model), a validation set (e.g., a set of data used to evaluate a fit of the model and/or to fine tune the model), a test set (e.g., a set of data used to evaluate a final fit of the model), and/or the like. In some implementations, the transaction backend platform may preprocess and/or perform dimensionality reduction to reduce the data of the historical transaction information to a minimum feature set. In some implementations, the transaction backend platform may train the risk analysis model on this minimum feature set, thereby reducing processing to train the machine learning model, and may apply a classification technique, to the minimum feature set. In some implementations, the transaction backend platform may train the risk analysis model based on historical transaction information that is applicable to the user. In some implementations, the transaction backend platform may train the risk analysis model based on historical transaction information that is applicable to a plurality of users, which may or may not include the user.

In some implementations, the transaction backend platform may use a classification technique, such as a logistic regression classification technique, a random forest classification technique, a gradient boosting machine learning (GBM) technique, and/or the like, to determine a categorical outcome (e.g., that a transaction characteristic has a high likelihood of being associated with fraudulent activity, that a transaction characteristic has a low likelihood of being associated with fraudulent activity, and/or the like). Additionally, or alternatively, the transaction backend platform may use a naïve Bayesian classifier technique. In this case, the transaction backend platform may perform binary recursive partitioning to split the data of the minimum feature set into partitions and/or branches and use the partitions and/or branches to perform predictions (e.g., that a transaction characteristic has a high or low likelihood of being associated with fraudulent activity). Based on using recursive partitioning, the transaction backend platform may reduce utilization of computing resources relative to manual, linear sorting and analysis of data items, thereby enabling use of thousands, millions, or billions of data items to train a model, which may result in a more accurate model than using fewer data items.

Additionally, or alternatively, the transaction backend platform may use a support vector machine (SVM) classifier technique to generate a non-linear boundary between data items in the training set. In this case, the non-linear boundary is used to classify test data (e.g., data relating transaction characteristics) into a particular class (e.g., a class indicating that the transaction characteristic has a high likelihood of being associated with fraudulent activity, a class indicating that the transaction characteristic has a low likelihood of being associated with fraudulent activity, and/or the like).

Additionally, or alternatively, where the test data includes image data, video data, and/or the like, the transaction backend platform may use a computer vision technique, such as a convolutional neural network technique to assist in classifying test data (e.g., data relating to an attribute of a transaction characteristic) into a particular class (e.g., a class indicating that the transaction characteristic has a high likelihood of being associated with fraudulent activity, a class indicating that the transaction characteristic has a low likelihood of being associated with fraudulent activity, and/or the like). In some cases, the computer vision technique may include using an image recognition technique (e.g., an Inception framework, a ResNet framework, a Visual Geometry Group (VGG) framework, and/or the like), an object detection technique (e.g. a Single Shot Detector (SSD) framework, a You Only Look Once (YOLO) framework, and/or the like), an object in motion technique (e.g., an optical flow framework and/or the like), and/or the like.

Additionally, or alternatively, the transaction backend platform may train the risk analysis model using a supervised training procedure that includes receiving input to the model from a subject matter expert, which may reduce an amount of time, an amount of processing resources, and/or the like to train the risk analysis model relative to an unsupervised training procedure. In some implementations, the transaction backend platform may use one or more other model training techniques, such as a neural network technique, a latent semantic indexing technique, and/or the like. For example, the transaction backend platform may perform an artificial neural network processing technique (e.g., using a two-layer feedforward neural network architecture, a three-layer feedforward neural network architecture, and/or the like) to perform pattern recognition with regard to patterns of whether attributes of transaction characteristics described using different semantic descriptions can be used to determine whether the transaction characteristics have high or low likelihoods of being associated with fraudulent activity. In this case, using the artificial neural network processing technique may improve an accuracy of a model (e.g., the risk analysis model) generated by the transaction backend platform by being more robust to noisy, imprecise, or incomplete data, and by enabling the transaction backend platform to detect patterns and/or trends undetectable to human analysts or systems using less complex techniques.

As an example, the transaction backend platform may use a supervised multi-label classification technique to train the risk analysis model. For example, as a first step, the transaction backend platform may map attributes to a transaction characteristic. In this case, the attributes may be characterized as a high likelihood of being associated with fraudulent activity or a low likelihood of being associated with fraudulent activity based on characteristics of the attributes (e.g., whether a characteristic of an attribute is similar or associated with an attribute of a characteristic of the transaction characteristic) and an analysis of the attributes (e.g., by a technician, thereby reducing processing relative to the transaction backend platform being required to analyze each activity). As a second step, the transaction backend platform may determine classifier chains, whereby labels of target variables may be correlated (e.g., in this example, labels may be attributes and correlation may refer to a common characteristic of a transaction characteristic). In this case, the transaction backend platform may use an output of a first label as an input for a second label (as well as one or more input features, which may be other data relating to the transaction characteristics), and may determine a likelihood that particular attribute that includes a set of characteristics of transaction characteristics (some of which are associated with a particular transaction characteristic and some of which are not associated with the particular transaction characteristic) are associated with the particular transaction characteristic based on a similarity to other attributes that include similar characteristics. In this way, the transaction backend platform transforms classification from a multilabel-classification problem to multiple single-classification problems, thereby reducing processing utilization. As a third step, the transaction backend platform may determine a Hamming Loss Metric relating to an accuracy of a label in performing a classification by using the validation set of the data. For example, an accuracy with which a weighting applied to each attribute or characteristic and whether each attribute or characteristic is associated with a transaction characteristic or not, results in a correct prediction of whether a transaction characteristic has a high or low likelihood of being associated with fraudulent activity, thereby accounting for differing amounts to which association of any one attribute or characteristic influences a likelihood of being associated with fraudulent activity. As a fourth step, the transaction backend platform may finalize the model based on labels that satisfy a threshold accuracy associated with the Hamming Loss Metric and may use the model for subsequent prediction of whether attributes of a transaction characteristic are to result in a high or low likelihood of being associated with fraudulent activity.

As another example, the transaction backend platform may determine, using a linear regression technique, that a threshold percentage of transaction characteristics, in a set of transaction characteristics, have a low likelihood of being associated with fraudulent activity, and may determine that those transaction characteristics are to receive relatively low association scores. In contrast, the transaction backend platform may determine that another threshold percentage of transaction characteristics have a high likelihood of being associated with fraudulent activity and may assign a relatively high association score to those transaction characteristics. Based on the transaction characteristics having a high or low likelihood of being associated with fraudulent activity, the transaction backend platform may generate the risk analysis model and may use the risk analysis model for analyzing new transaction characteristics, and/or the like) that the transaction backend platform identifies.

In some implementations, a different device, such as a server device, may generate and train the risk analysis model. The different device may send the risk analysis model for use by the transaction backend platform. The different device may update and send (e.g., on a scheduled basis, on an on-demand basis, on a triggered basis, on a periodic basis, and/or the like) the risk analysis model to the transaction backend platform.

Accordingly, the transaction backend platform may use any number of artificial intelligence techniques, machine learning techniques, deep learning techniques, and/or the like to determine a risk score for the user-selected transaction characteristics and/or the institution-selected transaction characteristics based on the likelihood that the transaction characteristics are associated with fraudulent activity.

By determining a risk score associated with the user-selected transaction characteristics and/or the institution-selected transaction characteristics based on the risk analysis model, the transaction backend platform may leverage the knowledge of the user in the form of the user-selected transaction characteristics, the knowledge of the institution in the form of the institution-selected transaction characteristics, and the historical transaction data to improve the efficiency and accuracy of the transaction backend platform in applying appropriate priority levels of signature verification to transactions.

In some implementations, the transaction backend platform may not receive user-selected transaction characteristics (e.g., because the user did not select transaction characteristics, because the financial institution disabled a feature permitting user selection of transaction characteristics, and/or the like). In some implementations, the transaction backend platform may not receive institution-selected transaction characteristics (e.g., because the financial institution did not select transaction characteristics, because the financial institution permits the selections made by the user to be used independently to determine priority levels, and/or the like). In other words, in some implementations, the transaction backend platform may not receive user-selected transaction characteristics or institution-selected transaction characteristics. In such circumstances, transaction backend platform may determine, using the risk analysis model, risk scores for transaction characteristics without the aid of user-selected transaction characteristics or institution-selected transaction characteristics.

In some implementations, the transaction backend platform may receive user-selected transaction characteristics and institution-selected transaction characteristics that contradict each other. For example, a user-selected transaction characteristic may be a transaction amount greater than $500, and an institution-selected transaction characteristic may be a transaction amount greater than $100. In such circumstances, the transaction backend platform may use the transaction characteristic having a higher risk score to determine priority levels for transactions, use the user-selected transaction characteristic to determine priority levels for transactions, and/or use the institution-selected transaction characteristic to determine priority levels for transactions.

When later processing a transaction, the transaction backend platform may determine a total risk score for the transaction based on a combination of the risk scores associated with the characteristics of the transaction (e.g., the user-selected transaction characteristics and/or the institution-selected transaction characteristics). For example, the transaction backend platform may determine that transactions involving an amount greater than $100 have a risk score of one and that transactions involving a purchaser located outside of the United States have a risk score of five. For a transaction having an amount of $150 and involving a purchaser located outside of the United States, the transaction backend platform may determine that the transaction has a total risk score of six. In some implementations, the transaction backend platform may sum the risk scores associated with the characteristics to obtain the total risk score. In some implementations, the transaction backend platform may assign weights to different characteristics and may determine the total risk score based on a weighted combination of risk scores associated with the characteristics. For example, the risk scores associated with the user-selected transaction characteristics and/or the institution-selected transaction characteristics may be more heavily weighted than the risk scores of other transaction characteristics. In this way, different characteristics may contribute differently to the total risk score, which may improve the accuracy of the total risk score.

As shown in FIG. 1C, and by reference number 114, the transaction backend platform may associate thresholds for total risk scores with priority levels. In some implementations, the transaction backend platform may associate, for total risk scores, a first threshold with the low priority level, a second threshold with the medium priority level, and a third threshold with the high priority level, where the third threshold is higher than the second threshold and the second threshold is higher than the first threshold. For example, the transaction backend platform may associate total risk scores greater than or equal to zero but less than four with the low priority level, total risk scores of four or greater but less than seven with the medium priority level, and total risk scores of seven or greater with the high priority level. For the transaction having a total risk score of six described above, the transaction backend platform may determine that the medium priority level should be used for signature verification of the transaction. The total risk score values given above are merely provided as examples. In practice, different total risk score values may be used.

As shown in FIG. 1C, and by reference number 116, the transaction backend platform may associate the images of signatures with the priority levels. For example, the transaction backend platform may associate the image of the low priority signature with the low priority level, the image of the medium priority signature with the medium priority level, and the image of the high priority signature with the high priority level. In some implementations, the transaction backend platform may determine a priority level for a transaction and use the image of the signature associated with the priority level as a comparator signature for verifying a signature associated with the transaction, as described below in connection with FIGS. 1E and 1F.

In some implementations, the user device and/or the FI device may provide information to the user regarding transaction characteristics that may be associated with the user-provided signatures. For example, the user device and/or FI device may receive, from the transaction backend platform, information, such as risk scores for transaction characteristics, thresholds for total risk scores, priority levels, signatures associated with the priority levels, and/or the like. Based on the information from the transaction backend platform, the user device and/or the FI device may provide information to the user (e.g., by displaying information to the user, by generating a report and transmitting the report to the user (e.g., via email, physical mail, and/or the like), by generating a report and uploading it to a website accessible to the user, and/or the like), where the information relates transaction characteristics to the user-provided signatures. For example, the user device and/or the FI device may provide example transactions with different transaction characteristics and may indicate which of the user-provided signatures should be used for each example transaction.

Figure 1D:
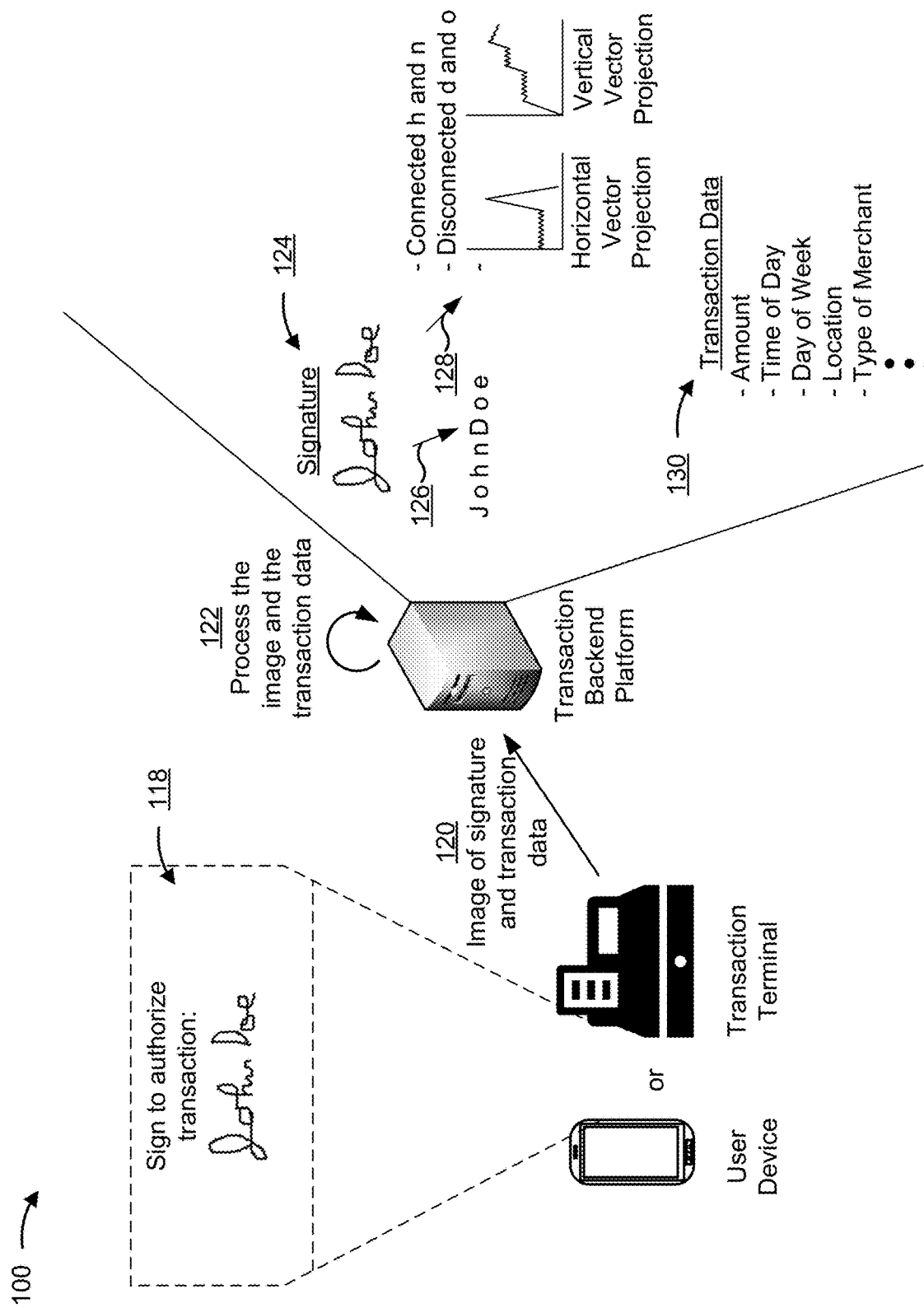

In some implementations, when the user pays for a transaction with a merchant, the merchant may request that the user provide a signature. As shown in FIG. 1D, and by reference number 118, a user device and/or a transaction terminal may capture an image of a signature provided by the user (e.g., by signing a touchscreen, by selecting a stored image of a signature, and/or the like). For example, the user device and/or the transaction terminal may include and/or be associated with a touchscreen, and the touchscreen may receive input from the user (e.g., via a finger touching the touchscreen, via a stylus touching the touchscreen, and/or the like). The touchscreen may display a trace corresponding to the input as the user provides the input, and capture an image of the displayed trace after receiving input from the user accepting the trace as a signature.

As shown in FIG. 1D, and by reference number 120, the user device and/or the transaction terminal may transmit, to the transaction backend platform in a request to approve the transaction, the image of the signature and transaction data. In some implementations, the transaction data includes information representative of characteristics of the transaction (e.g., an amount (e.g., amount of money exchanged in the transaction), a time of day, a day of the week, an identity of the merchant, a location of the merchant, a type of the merchant, an identity of the purchaser, a location of the purchaser (e.g., a location of the user device or the transaction terminal, and/or the like), a type of goods and/or services, a type of transaction, a type of agreement (e.g., mortgage agreement, auto loan agreement, home equity loan agreement, and/or the like), and/or the like.

As further shown in FIG. 1D, and by reference number 122, the transaction backend platform may process the image and the transaction data. In some implementations, the transaction backend platform may process the image of the signature 124 to identify characters or symbols 126 in the signature and/or attributes 128 of the signature. For example, the transaction backend platform may process the image of the signature using an image processing technique (e.g., a computer vision technique, a vector-based technique, and/or the like) to identify characters or symbols 126 in the signature and/or attributes 128 of the signature.

In some implementations, the transaction backend platform may process the image of the signature using an image processing technique that identifies a set of characters included in the signature, a set of symbols included in the signature, and/or a set of attributes of the signature. For example, the transaction backend platform may process the image of the signature to identify that particular characters and/or symbols included in the signature overlap, are connected, and/or are disconnected. As shown in FIG. 1D, the transaction backend platform may process the signature 124 to identify the characters 126 as "John Doe" and attributes 128 of the signature, such as that the "h" and "n" are connected and that the "d" and "o" are disconnected. In some implementations, the transaction backend platform may process the signature to identify attributes of the signature, such as height-to-width ratio, perpendicular lines within the signature, height of a location at which a cross is formed within a lowercase "t," presence or absence of a dot above a lowercase "i," downward or upward slope to a vertically central axis defined by the signature, and/or the like. In some implementations, the transaction backend platform may use the identified characters, symbols, and/or attributes of the signature to perform a comparison of the signature and a comparator signature as described below in connection with FIG. 1F.

In some implementations, the transaction backend platform may process the image of the signature using a computer vision technique that includes detecting a set of markings in the image that form the signature based on a contrast between the set of markings and a background of the image and identifying, based on detecting the set of markings, a set of characters included in the signature, a set of symbols included in the signature, and/or a set of attributes of the signature. In some implementations, the computer vision technique may include detecting a set of markings in the image by determining whether the contrast between the set of markings and the background satisfies a threshold (e.g., whether the signature markings are dark enough as compared to the background). In some implementations, the computer vision technique may not consider markings in the image to be part of the signature unless the contrast between the markings and the background satisfies a threshold. For example, if the image contains a grey signature line to aid the user in forming the signature, the computer vision technique may disregard the signature line in the image for purposes of detecting the markings forming the signature because the contrast between the signature line and the background is not great enough (e.g., the contrast does not satisfy a threshold).

In some implementations, the transaction backend platform may process the image of the signature using a vector-based technique that includes determining a horizontal vector projection for the signature based on a quantity of pixels of the image associated with the signature, and/or a vertical vector projection for the signature based on the quantity of pixels of the image associated with the signature. In some implementations, a horizontal vector projection of a signature may include a graphical plot of the number of pixels belonging to the signature versus the height of the signature in pixels. For example, the horizontal vector projection may plot the number of signature-containing pixels in an image as a function of a vertical axis of the image. In other words, the plot of the horizontal vector projection may represent the number of signature-containing pixels in the image at a given location along the vertical axis of the image.

In some implementations, a vertical vector projection of a signature may include a graphical plot of the number of pixels belonging to the signature versus the width of the signature in pixels. For example, the vertical vector projection may plot the number of signature-containing pixels in an image as a function of a horizontal axis of the image. In other words, the plot of the vertical vector projection may represent the number of signature-containing pixels in the image at a given location along the horizontal axis of the image.

In some implementations, the transaction backend platform may process the image of the signature using a vector-based technique that includes determining a vector projection for the signature. For example, the vector projection may include a graphical plot of the number of pixels belonging to the signature versus the width of the signature in pixels and the height of the signature in pixels. In other words, the plot of the vector projection may represent the number of signature-containing pixels in the image at a given location along the horizontal and/or vertical axis of the image. In some implementations, the transaction backend platform may use the horizontal vector projection, vertical vector projection, and/or vector projection of the signature to perform a comparison of the signature and a comparator signature as described below in connection with FIG. 1F.

In some implementations, the transaction backend platform may process the image of the signature using a vector-based technique that includes determining vectors that represent directional orientations of lines of the signature at points within the image. For example, the transaction backend platform may translate the signature into a series of vectors, where each vector represents a directional orientation of a line of the signature at a given point in the image, to obtain a vector translation of the signature. In some implementations, the transaction backend platform may use the vector translation of the signature to perform a comparison of the signature and a comparator signature as described below in connection with FIG. 1F.

As shown in FIG. 1D, and by reference number 130, the transaction backend platform may process the transaction data to identify characteristics of the transaction. For example, the transaction backend platform may process the transaction data to identify an amount (e.g., amount of money exchanged in the transaction), a time of day, a day of the week, an identity of the merchant, a location of the merchant, a type of the merchant, an identity of the purchaser (e.g., an identity of the user), a location of the purchaser (e.g., a location of the user), a type of goods and/or services, a type of transaction, a type of agreement (e.g., mortgage agreement, auto loan agreement, home equity loan agreement, and/or the like), and/or the like.

In some implementations, the transaction backend platform may process the transaction data and use the processed transaction data to identify additional characteristics of the transaction. For example, the transaction backend platform may receive transaction data including an identifier of the merchant (e.g., a merchant ID), process the transaction data by accessing a data structure storing information regarding merchants, and determine a type of the merchant, a type of goods and/or services, a location of the merchant, and/or the like based on the information in the data structure.

In some implementations, the transaction backend platform may use the risk analysis model as described above in connection with FIG. 1C to determine a risk score for the characteristics of the transaction identified by processing the transaction data. Based on the risk scores determined using the risk analysis model, the transaction backend platform may determine a total risk score for the transaction.

In some implementations, the transaction backend platform may determine a priority level associated with the transaction based on the total risk score. For example, the transaction backend platform may determine whether the total risk score satisfies one or more thresholds, such as a first threshold associated with the low priority level, a second threshold associated with the medium priority level, or a third threshold associated with the high priority level, where the third threshold is higher than the second threshold and the second threshold is higher than the first threshold.

In some implementations, the transaction backend platform may determine that the total risk score satisfies multiple thresholds associated with multiple priority levels. In such circumstances, the transaction backend platform may select the priority level associated with the highest threshold satisfied by the total risk score. For example, the transaction backend platform may associate total risk scores of less than four with the low priority level, total risk scores of four or greater with the medium priority level, and total risk scores of seven or greater with the high priority level. For a transaction having a total risk score of eight, the transaction backend platform may determine that the total risk score satisfies the threshold associated with the medium priority level and the threshold associated with the high priority level. In some implementations, the transaction backend platform may select the high priority level and determine that the transaction is associated with the high priority level.

In some implementations, the user device and/or transaction terminal may transmit, to the transaction backend platform, the transaction data before capturing an image of a signature, and the transaction backend platform may process the transaction data as described to determine the priority level associated with the transaction. The transaction backend platform may transmit information (e.g., the priority level, information identifying the type of signature associated with the priority level, and/or the like) to the user device and/or transaction terminal. The user device and/or transaction terminal may receive the information, process the information, and provide, to the user, a prompt describing a type of signature to be used (e.g., a prompt to provide a high priority signature, a prompt to provide a formal signature, such as "use formal signature," "sign full name and middle initial," and/or the like). The user device and/or transaction terminal may then capture an image of a signature provided by the user and transmit, to the transaction backend platform, a request to approve the transaction including the image of the signature.

As shown in FIG. 1E, and by reference number 132, the transaction backend platform may identify a comparator signature based on the priority level associated with the transaction from among a plurality of comparator signatures 134. For example, and as described in connection with FIG. 1A, the plurality of comparator signatures 134 may include the low priority signature (Signature 1), the medium priority signature (Signature 2), and the high priority signature (Signature 3). As shown in FIG. 1E, and by reference number 136, the transaction backend platform may select the high priority signature (Signature 3) based on determining that the transaction is associated with the high priority level.

Figure 1F:
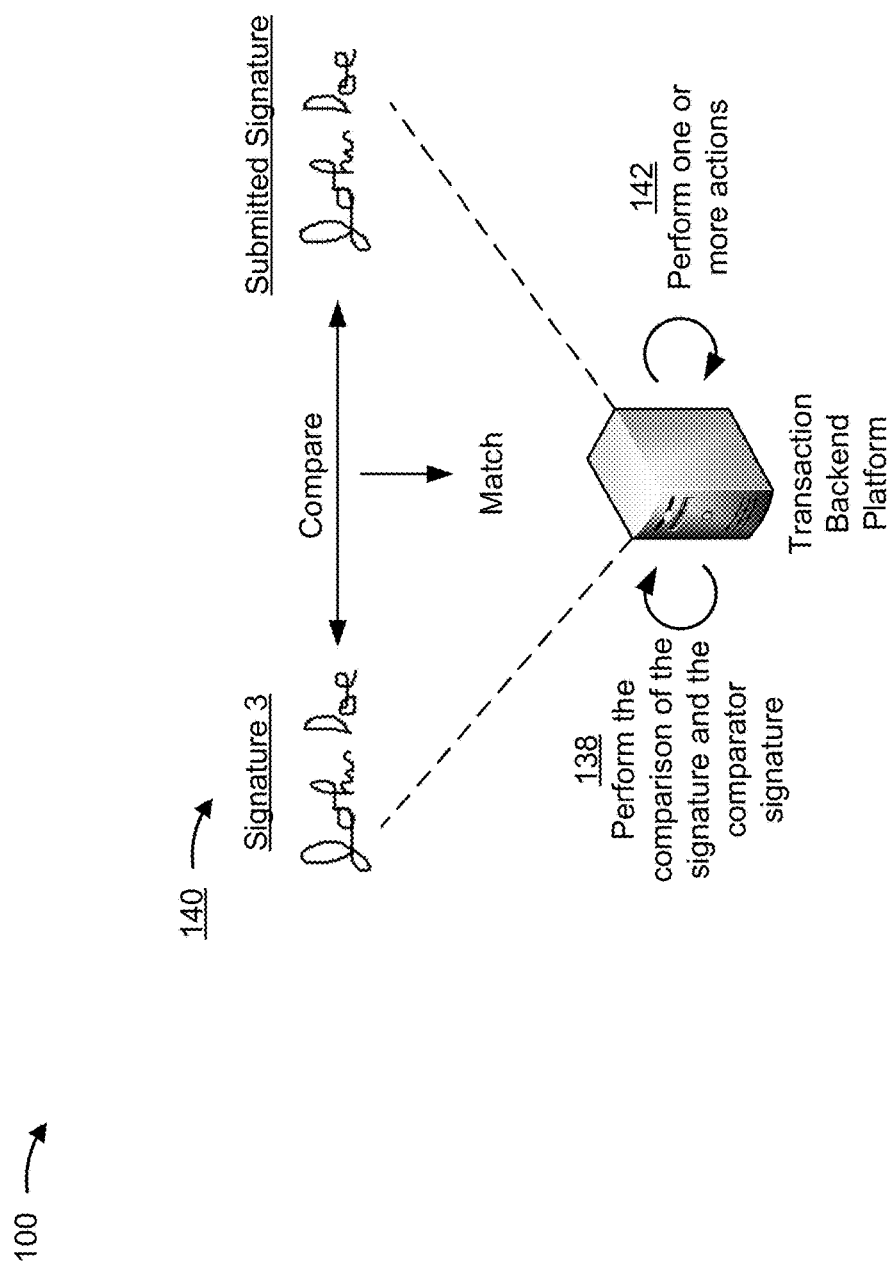

As shown in FIG. 1F, and by reference number 138, the transaction backend platform may perform a comparison of the comparator signature 140 selected based on the priority level and the signature in the image submitted in the request. In some implementations, the transaction backend platform may perform the comparison of the comparator signature and the signature based on corresponding sets of characters and/or symbols identified in the comparator signature and the signature. For example, the transaction backend platform may compare the comparator signature and the signature based on whether the comparator signature and the signature contain the same sets of letters for the first and/or last names.

In some implementations, the transaction backend platform may perform the comparison of the comparator signature and the signature based on corresponding characteristics of the comparator signature and the signature. For example, the transaction backend platform may compare the comparator signature and the signature based on whether the comparator signature and the signature have a similar height-to-width ratio (e.g., a height-to-width ratio of the signature is no more than five percent greater than or less than a height-to-width ratio of the comparator signature).

In some implementations, the transaction backend platform may perform the comparison of the comparator signature and the signature based on corresponding horizontal and/or vertical projections of the comparator signature and the signature. For example, the transaction backend platform may compare the comparator signature and the signature based on an analysis of the correspondence between the horizontal and/or vertical projections of the comparator signature and the horizontal and/or vertical projections of the signature.

In some implementations, if the transaction backend platform performs a comparison of the comparator signature associated with a first priority level and the signature and the comparison does not verify the signature, the transaction backend platform may select a comparator signature associated with a second priority level, where the second priority level is higher than the first priority level, and perform a comparison of the comparator signature associated with the second priority level and the signature. In other words, the transaction backend platform may use a comparator signature from a higher priority level than the priority level selected based on the total risk score of the transaction for comparison with a signature.

For example, if the transaction backend platform determines a low priority level based on the total risk score of the transaction, the transaction backend platform may initially perform a comparison of the low priority signature and the signature associated with the transaction. If the initial comparison does not result in a match, the transaction backend platform may next perform a comparison of the medium priority signature and the signature. If the comparison of the medium priority signature and the signature does not result in a match, the transaction backend platform may perform a comparison of the high priority signature and the signature. Stated differently, the transaction backend platform may verify the signature associated with the transaction based on comparator signatures associated with the priority level selected based on the total risk score and/or higher priority levels than the selected priority level.

In some implementations, the transaction backend platform may determine that the comparison of the comparator signature and the signature associated with the transaction satisfy a matching threshold. For example, the transaction backend platform may determine a score based on a degree of similarity between the comparator signature and the signature associated with the transaction and, in some implementations, may determine whether the score satisfies the matching threshold. For example, the transaction backend platform may compare the comparator signature and the signature based on whether the comparator signature and the signature have the same or similar height-to-width ratio and determine a score based on the correspondence between the height-to-width ratio of the comparator signature and the height-to-width ratio of the signature. The transaction backend platform may determine that the comparator signature and the signature associated with the transaction match if the score satisfies the matching threshold.

Some implementations, as described herein, conserve computing resources (e.g., processing resources, memory resources, power resources, and/or the like) and/or network resources involved in verifying signatures associated with transactions because the comparator signature associated with the priority level of the transaction, rather than all previously stored signatures, may be compared with the signature associated with the transaction.

As shown in FIG. 1F, and by reference number 142, the transaction backend platform may perform one or more actions based on a result of performing the comparison. In some implementations, the result of the comparison may include a determination that a similarity of the comparator signature and the signature associated with the transaction satisfies the matching threshold, a determination that a similarity of the comparator signature and the signature associated with the transaction does not satisfy the matching threshold, a determination that the comparator signature and the signature associated with the transaction are identical, and/or the like. In some implementations, if the transaction backend platform determines that the comparator signature and the signature associated with the transaction are identical and therefore potentially fraudulent, the transaction backend platform may deny the request to approve the transaction, transmit an alert to the user device and/or transaction terminal that sent the request, transmit an alert to an FI device, transmit an alert to a law enforcement agency, transmit a message to a financial institution to lock an account, and/or the like.

In some implementations, the transaction backend platform may perform one or more actions including transmitting to the user device and/or the transaction terminal an image of the user (e.g., for use by the merchant to confirm the identity of the purchaser, and/or the like). For example, the user device and/or the transaction terminal may display the image of the user, and the merchant may view the image to confirm an identity of the individual providing the signature by comparing the appearance of the individual providing the signature and the transmitted image. In some implementations, the user device and/or transaction terminal may include a camera and facial recognition software, may capture an image of the individual providing the signature, may compare the transmitted image from the transaction backend platform to the captured image of the individual providing the signature, and may perform one or more actions based on a result of the comparison (e.g., transmit a message to authorities indicating fraudulent activity may be occurring if the images do not match, transmit a message to the transaction backend device indicating that the images do or do not match, and/or the like).

In some implementations, the transaction backend platform may perform one or more actions including determining to approve the transaction, sending a message to an autonomous vehicle to cause an item to be delivered to a location (e.g., a flying drone to deliver the item to an address, a self-driving car or truck (e.g., carrying a robot for delivering an item from the car or truck to a front door), a robot within a warehouse to move the item from one location within the warehouse to another, and/or the like). For example, the transaction backend platform may determine that a similarity of the comparator signature and the signature associated with the transaction satisfies the matching threshold, transmit data to the user device and/or the transaction terminal indicating approval, transmit instructions to remove funds from an account of the user, transmit instructions to a robot within a warehouse to retrieve an item purchased in the transaction, transmit instructions to a printer to print a shipping label (e.g., based on the transaction data, and/or the like), transmit instructions to a shipping logistics system to schedule a shipment of the item, and/or the like.

In some implementations, the transaction backend platform may perform one or more actions based on a result of performing the comparison, where the one or more actions may include the transaction backend platform requesting that the user device and/or transaction terminal provide a prompt to the user to provide a new signature (e.g., a prompt to provide a medium priority signature, a prompt to provide a high priority signature, a prompt to provide a signature including a middle initial, and/or the like). For example, the user may provide a low priority signature (e.g., a low-quality signature, a sloppy signature, a scribble, and/or the like) for a $500 purchase. Upon receiving the image of the signature and the transaction data and processing the transaction data (see reference number 122 of FIG. 1D), the transaction backend platform may determine that the priority level for the transaction should be a high priority level based on the amount of the transaction (i.e., the $500 purchase amount) and may select a high priority comparator signature based on the high priority level. After processing the image of the signature and selecting a comparator signature based on the high priority level (see reference number 132 of FIG. 1E), the transaction backend platform may perform a comparison of the comparator signature and the signature in the image (see reference number 138 of FIG. 1F). Based on the comparison of the low priority signature provided by the individual and the high priority comparator signature associated with the high priority level, the transaction backend platform may transmit, to the user device and/or the transaction terminal, a request that the user device and/or transaction terminal provide a prompt to the user to provide a new signature (e.g., a prompt to provide a high priority signature, a prompt to provide a formal signature, such as "use formal signature," "sign full name and middle initial," and/or the like). By requesting that the user device and/or transaction terminal provide an informative prompt to the user to provide a new type of signature rather than merely denying the transaction, such implementations may conserve computing resources (e.g., processing resources, memory resources, power resources, communication resources, and/or the like) and/or network resources due to repeated attempts to request authorization of the transaction without obtaining a new signature and/or repeated attempts to request authorization of transactions with a new signature without the individual being prompted to provide the correct type of signature.

As indicated above, FIGS. 1A-1F are provided as one or more examples. Other examples may differ from what is described with regard to FIGS. 1A-1F.

FIG. 2 is a diagram of an example environment 200 in which systems and/or methods, described herein, may be implemented. As shown in FIG. 2, environment 200 may include a user device 210, a financial institution (FI) device 220, a transaction terminal 230, a transaction backend platform 240, a cloud computing environment 250, a computing resource 260, and a network 270. Devices of environment 200 may interconnect via wired connections, wireless connections, or a combination of wired and wireless connections.

User device 210 includes one or more devices capable of receiving, generating, storing, processing, and/or providing information associated with a transaction, such as transaction data and images of signatures. For example, user device 210 may include a communication and/or computing device, such as a mobile phone (e.g., a smart phone, a radiotelephone, etc.), a laptop computer, a tablet computer, a handheld computer, a desktop computer, a gaming device, a wearable communication device (e.g., a smart wristwatch, a pair of smart eyeglasses, etc.), or a similar type of device.

FI device 220 includes one or more devices capable of receiving, generating, storing, processing, and/or providing information, such as information described herein. For example, FI device 220 may include one or more devices associated with financial institutions (e.g., banks, credit unions, and/or the like) and/or transaction card associations, an automated teller machine (ATM) device, a kiosk device, and/or the like. An ATM device may include an electronic telecommunications device that enables customers of financial institutions to perform financial transactions, such as cash withdrawals, deposits, transferring funds, obtaining account information, and/or the like, at any time and without direct interaction with employees of the financial institutions. A kiosk device may include a computer terminal featuring specialized hardware and software that provides access to information and/or applications for communication, commerce, entertainment, education, and/or the like.

Transaction terminal 230 includes one or more devices capable of receiving, generating, storing, processing, and/or providing information associated with facilitating a transaction (such as a point of sale (PoS) transaction). For example, transaction terminal 230 may include a communication device and/or computing device capable of receiving data and/or processing a transaction based on the data. In some implementations, transaction terminal 230 may include a desktop computer, a laptop computer, a tablet computer, a handheld computer, and/or a mobile phone (e.g., a smart phone, a radiotelephone, etc.). Transaction terminal 230 may be owned and/or operated by one or more individuals or businesses engaged in a sale of goods or services (e.g., one or more merchants, vendors, service providers, and/or the like).

Transaction terminal 230 may include one or more devices to facilitate processing a transaction. Transaction terminal 230 may include a PoS terminal, a security access terminal, an automatic teller machine (ATM) terminal, and/or the like. Transaction terminal 230 may include one or more input devices and/or output devices to facilitate obtaining transaction data and/or interaction or authorization from a user. Example input devices of transaction terminal 230 may include a number keypad, a touchscreen, a magnetic strip reader, a chip reader, and/or a radio frequency (RF) signal reader. A magnetic strip reader of transaction terminal 230 may receive transaction card data as a magnetic strip of a transaction card is swiped along the magnetic strip reader. A chip reader of transaction terminal 230 may receive transaction card data from an IC chip (e.g., an EMV chip) of a transaction card when the chip is placed in contact with the chip reader. An RF signal reader of transaction terminal 230 may enable contactless transactions from a transaction card by obtaining transaction card data wirelessly from a transaction card as the transaction card comes within a range of transaction terminal 230 that the RF signal reader may detect an RF signal from an RF antenna of the transaction card. Example output devices of transaction terminal 230 may include a display device, a speaker, a printer, and/or the like.

Transaction backend platform 240 includes one or more computing resources assigned to receive, from user device 210, FI device 220, and/or transaction terminal 230, information (e.g., requests to approve transactions, and/or the like), process the information, and, based on the information, perform one or more actions (e.g., approve transactions, deny transactions, and/or the like), and/or the like. For example, transaction backend platform 240 may be a platform implemented by cloud computing environment 250 that may receive, from user device 210, FI device 220, and/or transaction terminal 230, information (e.g., requests to approve transactions, and/or the like), process the information, and, based on the information, perform one or more actions (e.g., approve transactions, deny transactions, and/or the like), and/or the like. In some implementations, transaction backend platform 240 is implemented by computing resources 260 of cloud computing environment 250.

Transaction backend platform 240 may include a server device or a group of server devices. In some implementations, transaction backend platform 240 may be hosted in cloud computing environment 250. Notably, while implementations described herein may describe transaction backend platform 240 as being hosted in cloud computing environment 250, in some implementations, transaction backend platform 240 may be non-cloud-based or may be partially cloud-based.

Cloud computing environment 250 includes an environment that delivers computing as a service, whereby shared resources, services, and/or the like may be provided to user device 210, FI device 220, and/or transaction terminal 230. Cloud computing environment 250 may provide computation, software, data access, storage, and/or other services that do not require end-user knowledge of a physical location and configuration of a system and/or a device that delivers the services. As shown, cloud computing environment 250 may include transaction backend platform 240 and/or computing resource 260.

Computing resource 260 includes one or more personal computers, workstation computers, server devices, or another type of computation and/or communication device. In some implementations, computing resource 260 may host transaction backend platform 240. The cloud resources may include computer instances executing in computing resource 260, storage devices provided in computing resource 260, data transfer devices provided by computing resource 260, and/or the like. In some implementations, computing resource 260 may communicate with other computing resources 260 via wired connections, wireless connections, or a combination of wired and wireless connections.

As further shown in FIG. 2, computing resource 260 may include a group of cloud resources, such as one or more applications ("APPs") 260-1, one or more virtual machines ("VMs") 260-2, virtualized storage ("VSs") 260-3, one or more hypervisors ("HYPs") 260-4, or the like.

Application 260-1 includes one or more software applications that may be provided to or accessed by, for example, user device 210, FI device 220, and/or transaction terminal 230. Application 260-1 may eliminate a need to install and execute the software applications on user device 210, FI device 220, and/or transaction terminal 230. For example, application 260-1 may include software associated with transaction backend platform 240 and/or any other software capable of being provided via cloud computing environment 250. In some implementations, one application 260-1 may send/receive information to/from one or more other applications 260-1, via virtual machine 260-2.

Virtual machine 260-2 includes a software implementation of a machine (e.g., a computer) that executes programs like a physical machine. Virtual machine 260-2 may be either a system virtual machine or a process virtual machine, depending upon use and degree of correspondence to any real machine by virtual machine 260-2. A system virtual machine may provide a complete system platform that supports execution of a complete operating system ("OS"). A process virtual machine may execute a single program and may support a single process. In some implementations, virtual machine 260-2 may execute on behalf of a user (e.g., user device 210, FI device 220, and/or transaction terminal 230), and may manage infrastructure of cloud computing environment 250, such as data management, synchronization, or long-duration data transfers.

Virtualized storage 260-3 includes one or more storage systems and/or one or more devices that use virtualization techniques within the storage systems or devices of computing resource 260. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 260-4 provides hardware virtualization techniques that allow multiple operating systems (e.g., "guest operating systems") to execute concurrently on a host computer, such as computing resource 260. Hypervisor 260-4 may present a virtual operating platform to the "guest operating systems" and may manage the execution of the guest operating systems. Multiple instances of a variety of operating systems may share virtualized hardware resources.

Network 270 includes one or more wired and/or wireless networks. For example, network 270 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
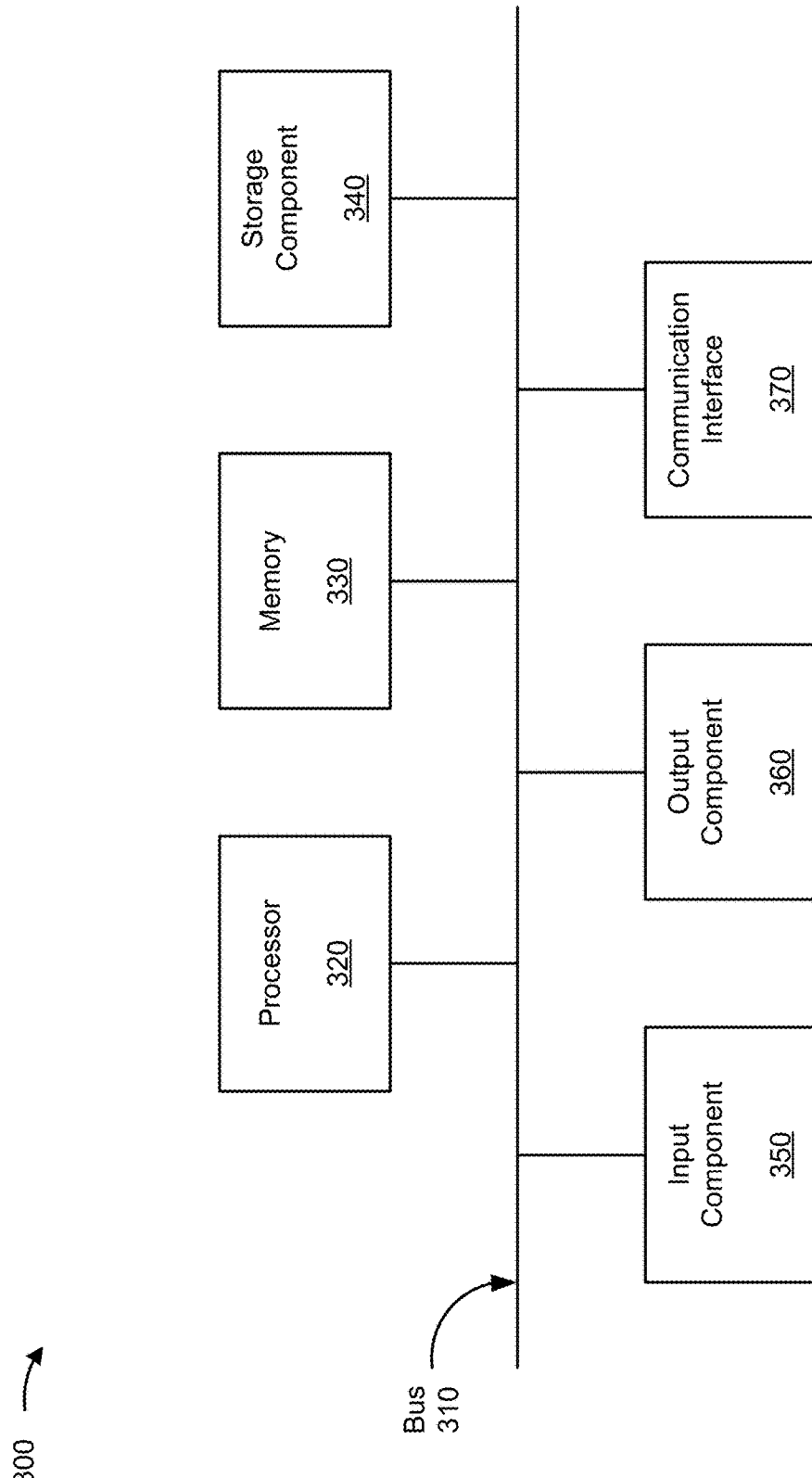
FIG. 3 is a diagram of example components of one or more devices of FIG. 2.

FIG. 3 is a diagram of example components of a device 300. Device 300 may correspond to user device 210, FI device 220, transaction terminal 230, transaction backend platform 240, and/or computing resource 260. In some implementations, user device 210, FI device 220, and/or transaction terminal 230, transaction backend platform 240, and/or computing resource 260 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system (GPS) component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
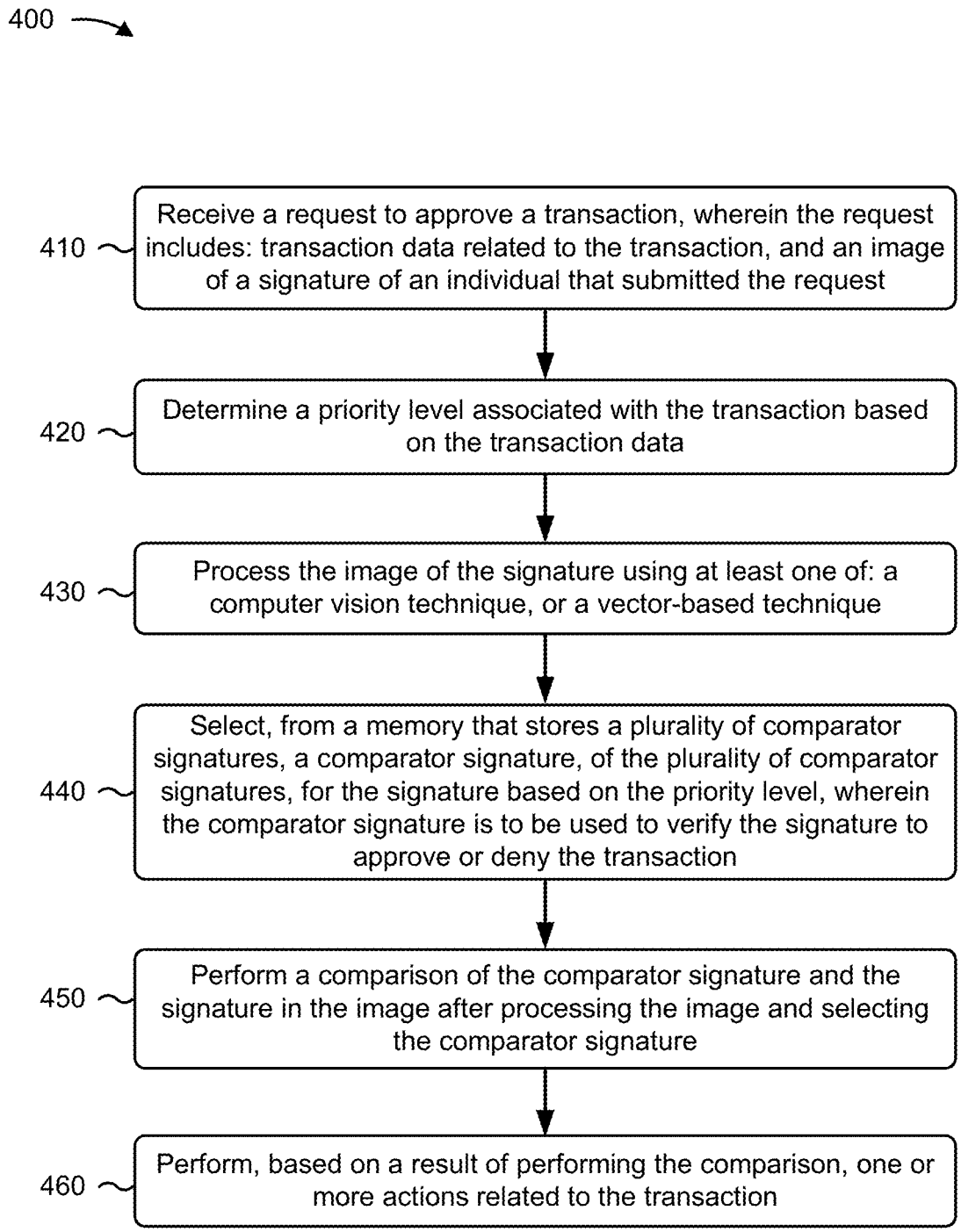
FIG. 4 is a flow chart of an example process for verifying a signature for a transaction.

FIG. 4 is a flow chart of an example process 400 for verifying a signature for a transaction. In some implementations, one or more process blocks of FIG. 4 may be performed by a transaction backend platform (e.g., transaction backend platform 240). In some implementations, one or more process blocks of FIG. 4 may be performed by another device or a group of devices separate from or including the transaction backend platform, such as a user device (e.g., user device 210), an FI device (e.g., FI device 220), a transaction terminal (e.g., transaction terminal 230), and/or the like.

As shown in FIG. 4, process 400 may include receiving, from a second device, a request to approve a transaction, wherein the request includes transaction data related to the transaction and an image of a signature of an individual that submitted the request (block 410). For example, the transaction backend platform (e.g., using computing resource 260, processor 320, memory 330, storage component 340, input component 350, output component 360, communication interface 370, and/or the like) may receive, from a second device, a request to approve a transaction, as described above. In some implementations, the request includes transaction data related to the transaction and an image of a signature of an individual that submitted the request.

As further shown in FIG. 4, process 400 may include determining, after receiving the request, a priority level associated with the transaction based on the transaction data (block 420). For example, the transaction backend platform (e.g., using computing resource 260, processor 320, memory 330, storage component 340, input component 350, output component 360, communication interface 370, and/or the like) may determine, after receiving the request, a priority level associated with the transaction based on the transaction data, as described above.

As further shown in FIG. 4, process 400 may include processing the image of the signature using at least one of a computer vision technique, or a vector-based technique (block 430). For example, the transaction backend platform (e.g., using computing resource 260, processor 320, memory 330, storage component 340, input component 350, output component 360, communication interface 370, and/or the like) may process the image of the signature using at least one of a computer vision technique or a vector-based technique, as described above.

As further shown in FIG. 4, process 400 may include selecting, from a memory that stores a plurality of comparator signatures, a comparator signature, of the plurality of comparator signatures, for the signature based on the priority level, wherein the comparator signature is to be used to verify the signature to approve or deny the transaction (block 440). For example, the transaction backend platform (e.g., using computing resource 260, processor 320, memory 330, storage component 340, input component 350, output component 360, communication interface 370, and/or the like) may select, from a memory that stores a plurality of comparator signatures, a comparator signature, of the plurality of comparator signatures, for the signature based on the priority level, as described above. In some implementations, the comparator signature is to be used to verify the signature to approve or deny the transaction.

As further shown in FIG. 4, process 400 may include performing a comparison of the comparator signature and the signature in the image after processing the image and selecting the comparator signature (block 450). For example, the transaction backend platform (e.g., using computing resource 260, processor 320, memory 330, storage component 340, input component 350, output component 360, communication interface 370, and/or the like) may perform a comparison of the comparator signature and the signature in the image after processing the image and selecting the comparator signature, as described above.

As further shown in FIG. 4, process 400 may include performing, based on a result of performing the comparison, one or more actions related to the transaction (block 460). For example, the transaction backend platform (e.g., using computing resource 260, processor 320, memory 330, storage component 340, input component 350, output component 360, communication interface 370, and/or the like) may perform, based on a result of performing the comparison, one or more actions related to the transaction, as described above.

Process 400 may include additional implementations, such as any single implementation or any combination of implementations described below and/or in connection with one or more other processes described elsewhere herein.

In a first implementation, process 400 may include receiving, from the second device and prior to receiving the request, corresponding images of the plurality of comparator signatures and information that identifies corresponding priority levels associated with the plurality of comparator signatures, and storing, in the memory, the corresponding images and the information after receiving the corresponding images and the information.

In a second implementation, alone or in combination with the first implementation, the second device includes at least one of a user device, a transaction terminal, or a financial institution device.

In a third implementation, alone or in combination with one or more of the first and second implementations, determining the priority level comprises determining the priority level based on at least one of an amount of the transaction, a type of the transaction, a location of the transaction, or one or more entities associated with the transaction.

In a fourth implementation, alone or in combination with one or more of the first through third implementations, processing the image of the signature using the computer vision technique comprises detecting a set of markings in the image that form the signature based on a contrast between the set of markings and a background of the image and identifying, based on detecting the set of markings, at least one of a set of characters included in the signature, a set of symbols included in the signature, or a set of characteristics of the signature.

In a fifth implementation, alone or in combination with one or more of the first through fourth implementations, processing the image of the signature using the vector-based technique comprises at least one of determining a horizontal vector projection for the signature based on a height of the signature in the image in pixels, determining a vertical vector projection for the signature based on a width of the signature in the image in pixels, or determining vectors that represent directional orientations of the signature at points in the image.

In a sixth implementation, alone or in combination with one or more of the first through fifth implementations, performing the comparison comprises: performing the comparison of the comparator signature and the signature based on at least one of corresponding sets of characters included in the comparator signature and the signature, corresponding sets of symbols included in the comparator signature and the signature, corresponding characteristics of the comparator signature and the signature, corresponding horizontal projections of the comparator signature and the signature, or corresponding vertical projections of the comparator signature and the signature.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
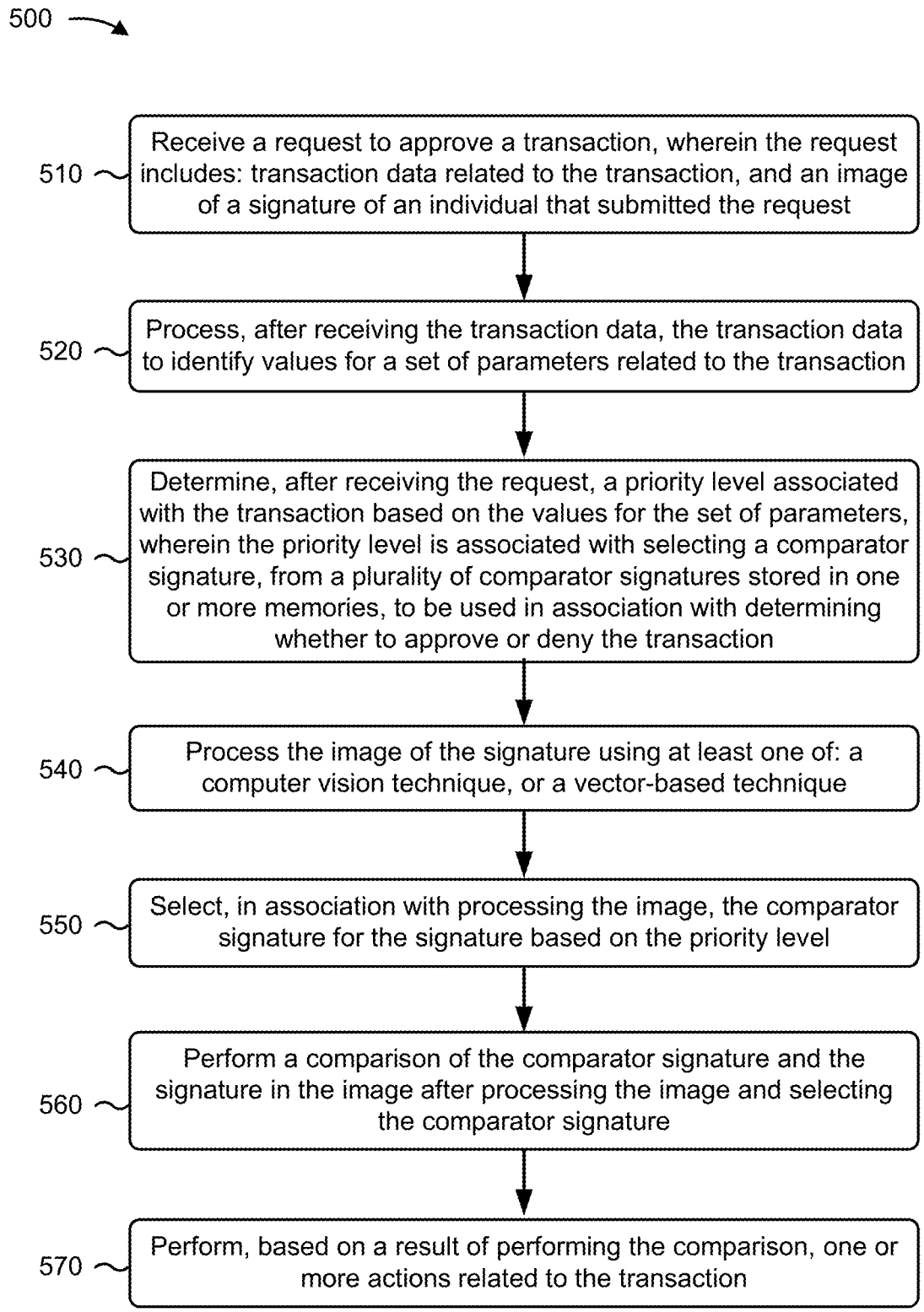
FIG. 5 is a flow chart of an example process for verifying a signature for a transaction.

FIG. 5 is a flow chart of an example process 500 for verifying a signature for a transaction. In some implementations, one or more process blocks of FIG. 5 may be performed by a transaction backend platform (e.g., transaction backend platform 240). In some implementations, one or more process blocks of FIG. 5 may be performed by another device or a group of devices separate from or including the transaction backend platform, such as a user device (e.g., user device 210), an FI device (e.g., FI device 220), a transaction terminal (e.g., transaction terminal 230), and/or the like.

As shown in FIG. 5, process 500 may include receiving a request to approve a transaction, wherein the request includes transaction data related to the transaction and an image of a signature of an individual that submitted the request (block 510). For example, the transaction backend platform (e.g., using computing resource 260, processor 320, memory 330, storage component 340, input component 350, output component 360, communication interface 370, and/or the like) may receive a request to approve a transaction, as described above. In some implementations, the request includes transaction data related to the transaction and an image of a signature of an individual that submitted the request.

As further shown in FIG. 5, process 500 may include processing, after receiving the transaction data, the transaction data to identify values for a set of parameters related to the transaction (block 520). For example, the transaction backend platform (e.g., using computing resource 260, processor 320, memory 330, storage component 340, input component 350, output component 360, communication interface 370, and/or the like) may process, after receiving the transaction data, the transaction data to identify values for a set of parameters related to the transaction, as described above.

As further shown in FIG. 5, process 500 may include determining, after receiving the request, a priority level associated with the transaction based on the values for the set of parameters, wherein the priority level is associated with selecting a comparator signature, from a plurality of comparator signatures stored in one or more memories, to be used in association with determining whether to approve or deny the transaction (block 530). For example, the transaction backend platform (e.g., using computing resource 260, processor 320, memory 330, storage component 340, input component 350, output component 360, communication interface 370, and/or the like) may determine, after receiving the request, a priority level associated with the transaction based on the values for the set of parameters, as described above. In some implementations, the priority level is associated with selecting a comparator signature, from a plurality of comparator signatures stored in one or more memories, to be used in association with determining whether to approve or deny the transaction.

As further shown in FIG. 5, process 500 may include processing the image of the signature using at least one of a computer vision technique or a vector-based technique (block 540). For example, the transaction backend platform (e.g., using computing resource 260, processor 320, memory 330, storage component 340, input component 350, output component 360, communication interface 370, and/or the like) may process the image of the signature using at least one of a computer vision technique or a vector-based technique, as described above.

As further shown in FIG. 5, process 500 may include selecting, in association with processing the image, the comparator signature for the signature based on the priority level (block 550). For example, the transaction backend platform (e.g., using computing resource 260, processor 320, memory 330, storage component 340, input component 350, output component 360, communication interface 370, and/or the like) may select, in association with processing the image, the comparator signature for the signature based on the priority level, as described above.

As further shown in FIG. 5, process 500 may include performing a comparison of the comparator signature and the signature in the image after processing the image and selecting the comparator signature (block 560). For example, the transaction backend platform (e.g., using computing resource 260, processor 320, memory 330, storage component 340, input component 350, output component 360, communication interface 370, and/or the like) may perform a comparison of the comparator signature and the signature in the image after processing the image and selecting the comparator signature, as described above.

As further shown in FIG. 5, process 500 may include performing, based on a result of performing the comparison, one or more actions related to the transaction (block 570). For example, the transaction backend platform (e.g., using computing resource 260, processor 320, memory 330, storage component 340, input component 350, output component 360, communication interface 370 and/or the like) may perform, based on a result of performing the comparison, one or more actions related to the transaction, as described above.

Process 500 may include additional implementations, such as any single implementation or any combination of implementations described below and/or in connection with one or more other processes described elsewhere herein.

In a first implementation, process 500 may include, when receiving the request, receiving the request from at least one of an application installed on a user device or a transaction terminal.

In a second implementation, alone or in combination with the first implementation, the set of parameters may identify at least one of an amount of the transaction, a type of the transaction, a location of the transaction, or one or more entities associated with the transaction.

In a third implementation, alone or in combination with one or more of the first and second implementations, process 500 may include, when processing the image of the signature using the computer vision technique, detecting a set of markings in the image that form the signature based on a contrast between the set of markings and a background of the image, wherein the contrast satisfies a threshold, and identifying, based on detecting the set of markings, at least one of a set of characters included in the signature, a set of symbols included in the signature, or a set of characteristics of the signature.

In a fourth implementation, alone or in combination with one or more of the first through third implementations, process 500 may include, when processing the image of the signature using the vector-based technique, determining at least one of a horizontal vector projection for the signature based on a quantity of pixels of the image associated with the signature, or a vertical vector projection for the signature based on the quantity of pixels of the image associated with the signature, wherein the horizontal vector projection or the vertical vector projection are to be used to verify the signature.

In a fifth implementation, alone or in combination with one or more of the first through fourth implementations, process 500 may include, when performing the comparison, performing the comparison of the comparator signature and the signature based on at least one of corresponding sets of characters included in the comparator signature and the signature, corresponding sets of symbols included in the comparator signature and the signature, corresponding characteristics of the comparator signature and the signature, corresponding horizontal projections of the comparator signature and the signature, or corresponding vertical projections of the comparator signature and the signature.

In a sixth implementation, alone or in combination with one or more of the first through fifth implementations, process 500 may include, when performing the one or more actions, determining to approve the transaction based on a score satisfying a threshold, wherein the score indicates a degree of similarity between the comparator signature and the signature, and sending a message to an autonomous vehicle to cause an item to be delivered to a location after determining to approve the transaction.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
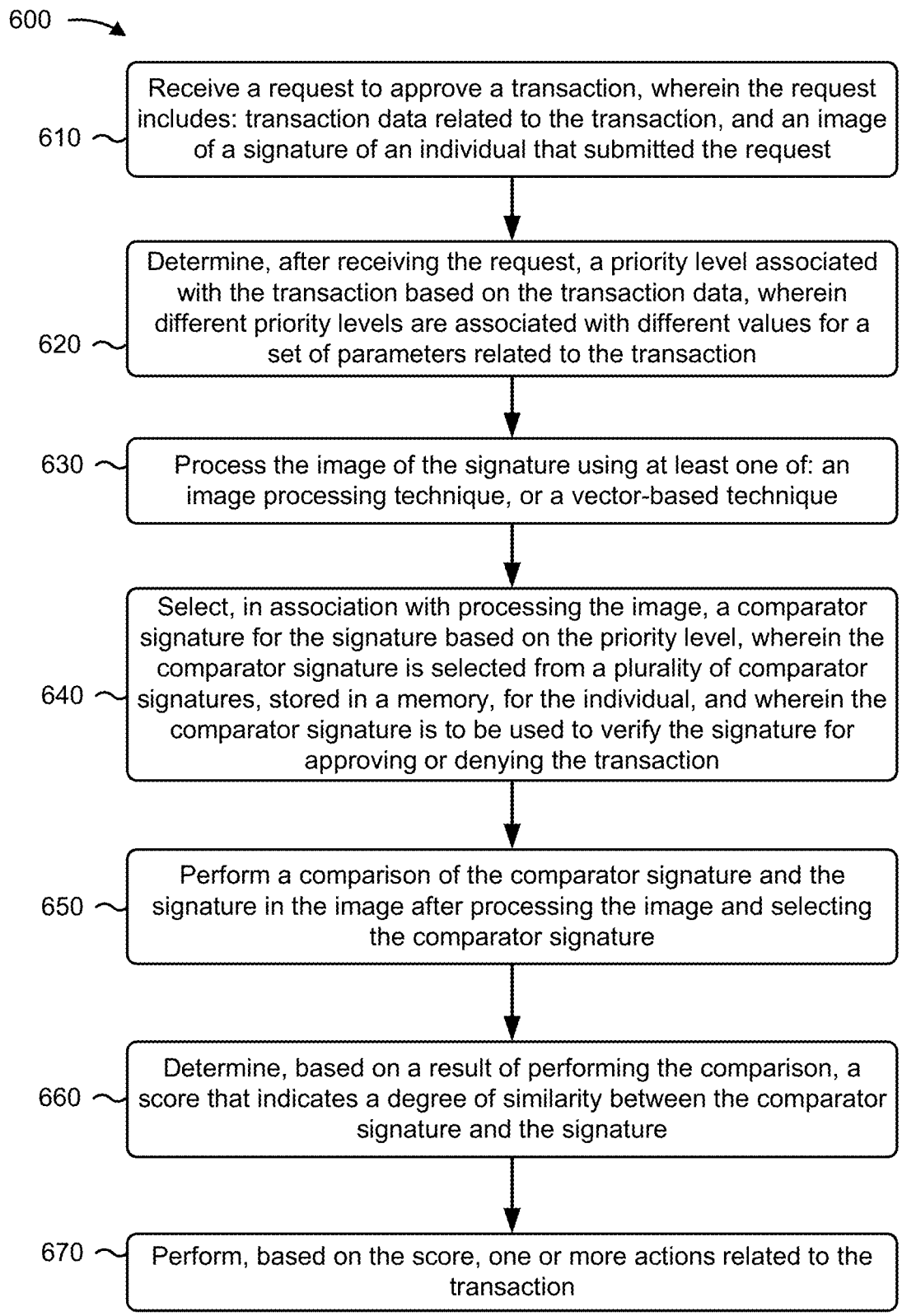
FIG. 6 is a flow chart of an example process for verifying a signature for a transaction.

FIG. 6 is a flow chart of an example process 600 for verifying a signature for a transaction. In some implementations, one or more process blocks of FIG. 6 may be performed by a transaction backend platform (e.g., transaction backend platform 240). In some implementations, one or more process blocks of FIG. 6 may be performed by another device or a group of devices separate from or including the transaction backend platform, such as a user device (e.g., user device 210), an FI device (e.g., FI device 220), a transaction terminal (e.g., transaction terminal 230), and/or the like.

As shown in FIG. 6, process 600 may include receiving, from a second device, a request to approve a transaction wherein the request includes transaction data related to the transaction and an image of a signature of an individual that submitted the request (block 610). For example, the transaction backend platform (e.g., using computing resource 260, processor 320, memory 330, storage component 340, input component 350, output component 360, communication interface 370, and/or the like) may receive, from a second device, a request to approve a transaction, as described above. In some implementations, the request includes transaction data related to the transaction and an image of a signature of an individual that submitted the request.

As further shown in FIG. 6, process 600 may include determining, after receiving the request, a priority level associated with the transaction based on the transaction data, wherein different priority levels are associated with different values for a set of parameters related to the transaction (block 620). For example, the transaction backend platform (e.g., using computing resource 260, processor 320, memory 330, storage component 340, input component 350, output component 360, communication interface 370, and/or the like) may determine, after receiving the request, a priority level associated with the transaction based on the transaction data, as described above. In some implementations, different priority levels are associated with different values for a set of parameters related to the transaction.

As further shown in FIG. 6, process 600 may include processing the image of the signature using at least one of an image processing technique or and a vector-based technique (block 630). For example, the transaction backend platform (e.g., using computing resource 260, processor 320, memory 330, storage component 340, input component 350, output component 360, communication interface 370, and/or the like) may process the image of the signature using at least one of an image processing technique or and a vector-based technique, as described above.

As further shown in FIG. 6, process 600 may include selecting, in association with processing the image, a comparator signature for the signature based on the priority level, wherein the comparator signature is selected from a plurality of comparator signatures, stored in a memory, for the individual, and wherein the comparator signature is to be used to verify the signature for approving or denying the transaction (block 640). For example, the transaction backend platform (e.g., using computing resource 260, processor 320, memory 330, storage component 340, input component 350, output component 360, communication interface 370, and/or the like) may select, in association with processing the image, a comparator signature for the signature based on the priority level, as described above. In some implementations, the comparator signature is selected from a plurality of comparator signatures, stored in a memory, for the individual. In some implementations, the comparator signature is to be used to verify the signature for approving or denying the transaction.

As further shown in FIG. 6, process 600 may include performing a comparison of the comparator signature and the signature in the image after processing the image and selecting the comparator signature (block 650). For example, the transaction backend platform (e.g., using computing resource 260, processor 320, memory 330, storage component 340, input component 350, output component 360, communication interface, 370 and/or the like) may perform a comparison of the comparator signature and the signature in the image after processing the image and selecting the comparator signature, as described above.

As further shown in FIG. 6, process 600 may include determining, based on a result of performing the comparison, a score that indicates a degree of similarity between the comparator signature and the signature (block 660). For example, the transaction backend platform (e.g., using computing resource 260, processor 320, memory 330, storage component 340, input component 350, output component 360, communication interface 370, and/or the like) may determine, based on a result of performing the comparison, a score that indicates a degree of similarity between the comparator signature and the signature, as described above.

As further shown in FIG. 6, process 600 may include performing, based on the score, one or more actions related to the transaction (block 670). For example, the transaction backend platform (e.g., using computing resource 260, processor 320, memory 330, storage component 340, input component 350, output component 360, communication interface 370, and/or the like) may perform, based on the score, one or more actions related to the transaction, as described above.

Process 600 may include additional implementations, such as any single implementation or any combination of implementations described below and/or in connection with one or more other processes described elsewhere herein.

In a first implementation, process 600 may include, when processing the image of the signature using the image processing technique, identifying at least one of a set of characters included in the signature, a set of symbols included in the signature, or a set of characteristics of the signature.

In a second implementation, alone or in combination with the first implementation, process 600 may include, when processing the image of the signature using the vector-based technique, determining a vector projection for the signature, wherein the vector projection is related to a height or a width of the signature in pixels at various points in the image.

In a third implementation, alone or in combination with one or more of the first through second implementations, process 600 may include, when performing the comparison, performing the comparison of the comparator signature and the signature based on at least one of corresponding sets of characters included in the comparator signature and the signature, corresponding sets of symbols included in the comparator signature and the signature, corresponding characteristics of the comparator signature and the signature, or corresponding projections of the comparator signature and the signature.

In a fourth implementation, alone or in combination with one or more of the first through third implementations, process 600 may include, when performing the one or more actions, determining to deny the transaction based on the score failing to satisfy a threshold and at least one of sending a message to a server device to lock an account associated with the individual or sending a message to a dispatch center to dispatch another individual to a location associated with the transaction.

In a fifth implementation, alone or in combination with one or more of the first through fourth implementations, process 600 may include, when performing the one or more actions, determining a failure result for the comparison based on the score failing to satisfy a threshold and providing a message for display via a second device that identifies the failure result or causing a user interface, associated with inputting another signature, to be provided for display via the second device.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a first device and from at least one of a user device, a transaction device, or a financial institution device, a request to approve a transaction,
        wherein the request includes:
            transaction data related to the transaction, and
            an image of an electronic signature that is manually provided by an individual, that submitted the request, via a user interface of the at least one of the user device, the transaction device, or the financial institution device, and wherein the first device includes a memory storing:
            images of a plurality of comparator electronic signatures, that are manually provided by the individual via the user interface of the at least one of the user device, the transaction device, or the financial institution device, including:
                an image of a first comparator electronic signature, and
                an image of a second comparator electronic signature different from the first comparator electronic signature, and
            information that identifies a plurality of priority levels, selected by the individual via the user interface of the at least one of the user device, the transaction device, or the financial institution device to correspond to the plurality of comparator electronic signatures, including:
                a first priority level corresponding to the first comparator electronic signature, and
                a second priority level corresponding to the second comparator electronic signature and different from the first priority level;
    determining, by the first device and after receiving the request, that the transaction is associated with the first priority level based on the transaction data;
    processing, by the first device, the image of the electronic signature, using at least one of a computer vision technique or a vector-based technique, to identify one or more attributes of the electronic signature in the image of the electronic signature provided in the request to approve the transaction;
    selecting, by the first device and from the memory, the image of the first comparator electronic signature based on the transaction being associated with the first priority level and the information that identifies the plurality of priority levels;
    performing, by the first device, a comparison of one or more attributes of the first comparator electronic signature, in the image of the first comparator electronic signature, to the one or more attributes of the electronic signature in the image of the electronic signature; and
    determining, by the first device and based on a result of performing the comparison, whether the comparison satisfies a matching threshold.

2. The method of claim 1, further comprising:
    receiving, from the at least one of the user device, the transaction device, or the financial institution device and prior to receiving the request, the images of the plurality of comparator electronic signatures and the information that identifies the plurality of priority levels; and
    storing, in the memory, the images of the plurality of comparator electronic signatures and the information that identifies the plurality of priority levels after receiving the images of the plurality of comparator electronic signatures and the information that identifies the plurality of priority levels.

3. The method of claim 1, wherein determining that the transaction is associated with the first priority level is based on at least one of:
    an amount of the transaction,
    a type of the transaction,
    a location of the transaction, or
    one or more entities associated with the transaction.

4. The method of claim 1, wherein processing the image of the electronic signature using the computer vision technique comprises:
    detecting, using the at least one of the computer vision technique or vector-based technique, a set of markings in the image of the electronic signature based on a contrast between the set of markings and a background of the image of the electronic signature; and
    identifying, based on detecting the set of markings, attributes of at least one of:
    a set of characters included in the electronic signature,
    a set of symbols included in the electronic signature, or
    a set of characteristics of the electronic signature.

5. The method of claim 1, wherein processing the image of the electronic signature using the vector-based technique comprises at least one of:
    determining a horizontal vector projection for the electronic signature based on a height of the electronic signature in the image of the electronic signature in pixels,
    determining a vertical vector projection for the electronic signature based on a width of the electronic signature in the image of the electronic signature in pixels, or
    determining vectors that represent directional orientations of the electronic signature at points in the image of the electronic signature.

6. The method of claim 1, wherein performing the comparison is based on at least one of:
    corresponding sets of characters included in the first comparator electronic signature and the electronic signature,
    corresponding sets of symbols included in the first comparator electronic signature and the electronic signature, corresponding characteristics of the first comparator electronic signature and the electronic signature,
corresponding horizontal projections of the first comparator electronic signature and the electronic signature, or
corresponding vertical projections of the first comparator electronic signature and the electronic signature.

7. The method of claim 1, further comprising:
training a machine learning model to determine a risk score for the transaction based on the transaction data related to transaction, historical transaction data related to historical transactions, and determinations regarding whether the transaction and historical transactions are associated with fraudulent activity.

8. The method of claim 7, further comprising:
assigning a first weight to one or more user-selected characteristics related to the transaction; and
assigning a second weight to one or more historical characteristics that are different than the one or more user-selected characteristics and related to the historical transactions,
wherein the second weight is greater than the first weight, and
wherein training the machine learning model is based on assigning the first weight to the one or more user-selected characteristics and assigning the second weight to the one or more historical characteristics.

9. A device, comprising:
one or more memories storing:
images of a plurality of comparator electronic signatures, that are manually provided by an individual via a user interface of at least one of a user device, a transaction device, or a financial institution device, including:
an image of a first comparator electronic signature, and
an image of a second comparator electronic signature different from the first comparator electronic signature, and
information that identifies a plurality of priority levels, selected by the individual via the user interface of the at least one of the user device, the transaction device, or the financial institution device to correspond to the plurality of comparator electronic signatures, including:
a first priority level corresponding to the first comparator electronic signature, and
a second priority level corresponding to the second comparator electronic signature and different than the first priority level; and
one or more processors, coupled to the one or more memories, to:
receive, from the at least one of the user device, the transaction device, or the financial institution device, a request to approve a transaction,
wherein the request includes:
transaction data related to the transaction, and
an image of an electronic signature that is manually provided by the individual, that submitted the request, via the user interface of the at least one of the user device, the transaction device, or the financial institution device;
process, after receiving the transaction data, the transaction data to identify values for a set of parameters related to the transaction;
determine, after receiving the request, that the transaction is associated with the first priority level based on the values for the set of parameters and the information that identifies the plurality of priority levels;
process the image of the electronic signature, using at least one of a computer vision technique or a vector-based technique, to identify one or more attributes of the electronic signature in the image of the electronic signature provided in the request to approve the transaction;
select, from the one or more memories, the image of the first comparator electronic signature based on the transaction being associated with the first priority level and the information that identifies the plurality of priority levels;
perform a comparison of one or more attributes of the first comparator electronic signature, in the image of the first comparator electronic signature, to the one or more attributes of the electronic signature in the image of the electronic signature; and
determine, based on a result of performing the comparison, whether the comparison satisfies a matching threshold.

10. The device of claim 9, wherein the set of parameters identifies at least one of:
an amount of the transaction,
a type of the transaction,
a location of the transaction, or
one or more entities associated with the transaction.

11. The device of claim 9, wherein the one or more processors, when processing the image of the electronic signature using the computer vision technique, are to:
detect a set of markings in the image of the electronic signature that form the electronic signature based on a contrast between the set of markings and a background of the image of the electronic signature,
wherein the contrast satisfies a contrast threshold; and
identify, based on detecting the set of markings, at least one of:
a set of characters included in the electronic signature,
a set of symbols included in the electronic signature, or
a set of characteristics of the electronic signature.

12. The device of claim 9, wherein the one or more processors, when processing the image of the electronic signature using the vector-based technique, are to:
determine at least one of:
a horizontal vector projection for the electronic signature based on a quantity of pixels of the image of the electronic signature associated with the electronic signature, or
a vertical vector projection for the electronic signature based on the quantity of pixels.

13. The device of claim 9, wherein performing the comparison is based on at least one of:
corresponding sets of characters included in the first comparator electronic signature and the electronic signature,
corresponding sets of symbols included in the first comparator electronic signature and the electronic signature,
corresponding characteristics of the first comparator electronic signature and the electronic signature,
corresponding horizontal projections of the first comparator electronic signature and the electronic signature, or
corresponding vertical projections of the first comparator electronic signature and the electronic signature.

14. The device of claim 9, wherein the one or more processors are further to:

determine, based on the transaction data, a risk score associated with the transaction,
wherein determining whether the comparison satisfies the matching threshold is further based on the risk score.

15. A non-transitory computer-readable medium storing instructions, the instructions comprising:
one or more instructions that, when executed by one or more processors of a first device, cause the one or more processors to:
store, in a memory of the first device:
images of a plurality of comparator electronic signatures, that are manually provided by an individual via a user interface of at least one of a user device, a transaction device, or a financial institution device, including:
an image of a first comparator electronic signature, and
an image of a second comparator electronic signature, and
information that identifies a plurality of priority levels, selected by the individual via the user interface of the at least one of the user device, the transaction device, or the financial institution device to correspond to the plurality of comparator electronic signatures, including:
a first priority level corresponding to the first comparator electronic signature, and
a second priority level corresponding to the second comparator electronic signature and different from the first priority level;
receive, from the at least one of the user device, the transaction device, or the financial institution device, a request to approve a transaction,
wherein the request includes:
transaction data related to the transaction, and
an image of an electronic signature that is manually provided by the individual, that submitted the request, via the user interface of the at least one of the user device, the transaction device, or the financial institution device;
determine, after receiving the request, that the transaction is associated with the first priority level based on the transaction data,
wherein different priority levels are associated with different values for a set of parameters related to the transaction;
process the image of the electronic signature, using at least one of a computer vision technique or a vector-based technique, to identify one or more attributes of the electronic signature in the image of the electronic signature provided in the request to approve the transaction;
select, in association with processing the image and from the memory, the image of the first comparator electronic signature based on the transaction being associated with the first priority level and the information that identifies the plurality of priority levels;
perform a comparison of one or more attributes of the first comparator electronic signature, in the image of the first comparator electronic signature, to the one or more attributes of the electronic signature in the image of the electronic signature;
determine, based on a result of performing the comparison, a similarity score that indicates a degree of similarity between the first comparator electronic signature and the electronic signature; and
determine, based on determining the similarity score, whether the similarity score satisfies a matching threshold.

16. The non-transitory computer-readable medium of claim 15, wherein the one or more instructions, that cause the one or more processors to process the image of the electronic signature using the image processing technique, cause the one or more processors to:
identify at least one of:
a set of characters included in the electronic signature,
a set of symbols included in the electronic signature, or
a set of characteristics of the electronic signature.

17. The non-transitory computer-readable medium of claim 15, wherein the one or more instructions, that cause the one or more processors to process the image of the electronic signature using the vector-based technique, cause the one or more processors to:
determine a vector projection for the electronic signature,
wherein the vector projection is related to a height or a width of the electronic signature in the image of the electronic signature in pixels at various points in the image of the electronic signature.

18. The non-transitory computer-readable medium of claim 15, wherein performing the comparison is based on at least one of:
corresponding sets of characters included in the first comparator electronic signature and the electronic signature,
corresponding sets of symbols included in the first comparator electronic signature and the electronic signature,
corresponding characteristics of the first comparator electronic signature and the electronic signature, or
corresponding projections of the first comparator electronic signature and the electronic signature.

19. The non-transitory computer-readable medium of claim 15, wherein the one or more instructions, when executed by the one or more processors, further cause the one or more processors to:
determine, based on the transaction data, a risk score associated with the transaction,
wherein determining whether the similarity score satisfies the matching threshold is further based on the risk score.

20. The non-transitory computer-readable medium of claim 15, wherein the one or more instructions, when executed by the one or more processors, further cause the one or more processors to:
determine a failure result for the comparison based determining whether the similarity score fails to satisfy the matching threshold; and
provide, based on determining the failure result, a message for display via the at least one of the user device, the transaction device, or the financial institution device that identifies the failure result, or
cause, based on determining the failure result, a second user interface that provides a prompt to provide a new type of signature to be provided for display via the at least one of the user device, the transaction device, or the financial institution device.

* * * * *